(12) United States Patent
Tsukagoshi

(10) Patent No.: US 10,375,448 B2
(45) Date of Patent: Aug. 6, 2019

(54) RECEPTION DEVICE, RECEPTION METHOD, TRANSMISSION DEVICE, AND TRANSMISSION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/738,856

(22) PCT Filed: Jun. 13, 2016

(86) PCT No.: PCT/JP2016/067598
§ 371 (c)(1),
(2) Date: Dec. 21, 2017

(87) PCT Pub. No.: WO2017/002602
PCT Pub. Date: Jan. 5, 2017

(65) Prior Publication Data
US 2018/0192153 A1    Jul. 5, 2018

(30) Foreign Application Priority Data

Jun. 30, 2015    (JP) .................................. 2015-132139

(51) Int. Cl.
*H04N 21/488*    (2011.01)
*H04N 21/485*    (2011.01)
(Continued)

(52) U.S. Cl.
CPC ....... *H04N 21/4884* (2013.01); *H04N 21/431* (2013.01); *H04N 21/435* (2013.01); *H04N 21/44218* (2013.01); *H04N 21/4858* (2013.01)

(58) Field of Classification Search
CPC combination set(s) only.
See application file for complete search history.

(56) References Cited

U.S. PATENT DOCUMENTS

2006/0092291 A1* 5/2006 Bodie ................ H04N 1/00307
                                                348/231.99
2006/0242590 A1* 10/2006 Polivy ................ G06F 16/9577
                                                715/760
(Continued)

FOREIGN PATENT DOCUMENTS

JP    2005-295338 A    10/2005
JP    2006-5418 A    1/2006
(Continued)

OTHER PUBLICATIONS

"Digital Video Broadcasting (DVB); Subtitling systems DVB Document A009," DVB BlueBook A 009, (online) <URL: http://www.dvb.org/resources/public/standards/A009_DVB-Subtitling.pdf>, Jul. 2013, (5 pages).

(Continued)

*Primary Examiner* — Alexander Gee
(74) *Attorney, Agent, or Firm* — Oblon, McClelland, Maier & Neustadt, L.L.P.

(57) ABSTRACT

To enable subtitles (graphics) to be favorably superimposed and displayed on video.

A container in a predetermined format is received, the container including a video stream having video data and a subtitle stream having subtitle data. The video stream is decoded to acquire the video data. The subtitle stream is decoded to acquire bitmap data of subtitles. Processing of correcting at least one of a size of the subtitles and a display position of the subtitles, is performed to the bitmap data of the subtitles. The bitmap data of the subtitles to which the processing has been performed, is superimposed on the video data to acquire display video data.

12 Claims, 20 Drawing Sheets

(51) Int. Cl.
*H04N 21/442* (2011.01)
*H04N 21/431* (2011.01)
*H04N 21/435* (2011.01)

(56) References Cited

U.S. PATENT DOCUMENTS

| | | | | |
|---|---|---|---|---|
| 2008/0177994 | A1* | 7/2008 | Mayer | G06F 9/4418 713/2 |
| 2011/0216163 | A1* | 9/2011 | Dougherty | H04N 13/00 348/43 |
| 2012/0133734 | A1* | 5/2012 | Tokunaga | H04N 5/607 348/43 |
| 2012/0320155 | A1* | 12/2012 | Suh | H04N 5/44508 348/43 |
| 2013/0315038 | A1* | 11/2013 | Ferren | G06K 9/3266 367/197 |
| 2014/0063187 | A1* | 3/2014 | Tsukagoshi | G09G 5/006 348/43 |
| 2014/0240472 | A1* | 8/2014 | Hamasaki | H04N 13/183 348/51 |
| 2015/0199329 | A1* | 7/2015 | Kim | G06F 17/27 715/254 |
| 2015/0277552 | A1* | 10/2015 | Wilairat | H04N 21/4884 386/244 |

FOREIGN PATENT DOCUMENTS

| | | |
|---|---|---|
| JP | 2012-114630 A | 6/2012 |
| JP | 2012-169885 A | 9/2012 |

OTHER PUBLICATIONS

International Search Report dated Sep. 13, 2016 in PCT/JP2016/067598 filed Jun. 13, 2016.

* cited by examiner

FIG. 3

TTML STRUCTURE

```
<tt tts:extent="1920px 1080px" />
   <head>
      <metadata/>
      <styling/>
       <layout/>
   </head>
   <body/>
</tt>
```

FIG. 4

(a) TTML Metadata (TTM)
```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
</metadata>
```

(b) TTML Styling (TTS)
```
<styling xmlns:tts="http://www.w3.org/ns/ttml#styling">
    <!-- s1 specifies default color, font, and text alignment -->
    <style xml:id="s1"
        tts:extent="560px 350px" tts:origin="480px 600px"
        tts:color="white"
        tts:fontFamily="proportionalSansSerif"
        tts:fontSize="22px"
        tts:textAlign="center"
    />
    <set bigin=" 0s" dur=" Xs" tts:opacity=" 1.0" />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

(c) TTML Layout (region)
```
<layout xmlns:tts="http://www.w3.org/ns/ttml#styling">
    <region xml:id="subtitleArea"
        style="s1"
        tts:padding="5px 3px"
        tts:backgroundColor="black"
        tts:displayAlign="after"
    />
</layout>
```

FIG. 5

REFERENCE POSITION (0, 0)

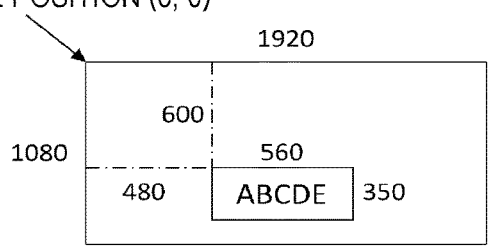

FIG. 6

TTML Body

```
<body region="subtitleArea">
    <div>
        <p xml:id="subtitle1" begin="0.76s" end="3.45s">
        It seems a paradox, does it not,
        </p>
        <p xml:id="subtitle2" begin="5.0s" end="10.0s">
        that the image formed on<br/>
        the Retina should be inverted?
        </p>
        <p xml:id="subtitle3" begin="10.0s" end="16.0s" style="s2">
        It is puzzling, why is it<br/>
        we do not see things upside-down?
        </p>
    </div>
</body>
```

FIG. 7

| Syntax | No. of Bits | Format |
|---|---|---|
| page_composition_segment() { | | |
| sync_byte | 8 | bslbf |
| segment_type | 8 | bslbf |
| page_id | 16 | bslbf |
| segment_length | 16 | uimsbf |
| page_time_out | 8 | uimsbf |
| page_version_number | 4 | uimsbf |
| page_state | 2 | bslbf |
| reserved | 2 | bslbf |
| while (processed_length < segment_length) { | | |
| region_id | 8 | bslbf |
| reserved | 8 | bslbf |
| region_horizontal_address | 16 | uimsbf |
| region_vertical_address | 16 | uimsbf |
| } | | |
| } | | |

FIG. 8

| Syntax | No. of Bits | Format |
| --- | --- | --- |
| region_composition_segment() { | | |
|     sync_byte | 8 | bslbf |
|     segment_type | 8 | bslbf |
|     page_id | 16 | bslbf |
|     segment_length | 16 | uimsbf |
|     region_id | 8 | uimsbf |
|     region_vesion_number | 4 | uimsbf |
|     region_fill_flag | 1 | bslbf |
|     reserved | 3 | bslbf |
|     region_width | 16 | uimsbf |
|     region_height | 16 | uimsbf |
|     region_level_of_compatibility | 3 | bslbf |
|     region_depth | 3 | bslbf |
|     reserved | 2 | bslbf |
|     CLUT_id | 8 | bslbf |
|     region_8-bit_pixel_code | 8 | bslbf |
|     region_4-bit_pixel_code | 4 | bslbf |
|     region_2-bit_pixel_code | 2 | bslbf |
|     reserved | 2 | bslbf |
|     while (processed_length < segment_length) { | | |
|         object_id | 16 | bslbf |
|         object_type | 2 | bslbf |
|         object_provider_flag | 2 | bslbf |
|         object_horizontal_position | 12 | uimsbf |
|         reserved | 4 | bslbf |
|         object_vertical_position | 12 | uimsbf |
|         if (object_type==0x01 or object_type==0x02){ | | |
|             foreground_pixel_code | 8 | bslbf |
|             background_pixel_code | 8 | bslbf |
|         } | | |
|     } | | |
| } | | |

FIG. 9

| Syntax | No. of Bits | Format |
|---|---|---|
| CLUT_definition_segment() { | | |
|     sync_byte | 8 | bslbf |
|     segment_type | 8 | bslbf |
|     page_id | 16 | bslbf |
|     segment_length | 16 | uimsbf |
|     CLUT_id | 8 | bslbf |
|     CLUT_version_number | 4 | uimsbf |
|     reserved | 4 | bslbf |
|     while (processed_length < segment_length) { | | |
|         CLUT_entry_id | 8 | bslbf |
|         2-bit/entry_CLUT_flag | 1 | bslbf |
|         4-bit/entry_CLUT_flag | 1 | bslbf |
|         8-bit/entry_CLUT_flag | 1 | bslbf |
|         reserved | 4 | bslbf |
|         full_range_flag | 1 | bslbf |
|         if full_range_flag=='1'{ | | |
|             Y-value | 8 | bslbf |
|             Cr-value | 8 | bslbf |
|             Cb-value | 8 | bslbf |
|             T-value | 8 | bslbf |
|         } else { | | |
|             Y-value | 6 | bslbf |
|             Cr-value | 4 | bslbf |
|             Cb-value | 4 | bslbf |
|             T-value | 2 | bslbf |
|         } | | |
|     } | | |
| } | | |

| Syntax | No. of Bits | Format |
|---|---|---|
| region_scaling_segment() { | | |
| sync_byte | 8 | bslbf |
| segment_type | 8 | bslbf |
| page_id | 16 | uimsbf |
| segment_length | 16 | bslbf |
| region_id | 8 | uimsbf |
| scale_up_factor | 8 | uimsbf |
| scale_down_factor | 8 | uimsbf |
| positioning_horizontal_factor | 8 | uimsbf |
| positioning_vertical_factor | 8 | uimsbf |
| } | | |

(b)

scale_up_factor (8bits)          ALLOWABLE MAXIMUM VALUE OF REGION SCALE-UP FACTOR IS INDICATED.

scale_down_factor (8bits)        ALLOWABLE MINIMUM VALUE OF REGION SCALE-DOWN FACTOR IS INDICATED.

positioning_horizontal_factor (8bits)   ALLOWABLE MAXIMUM VALUE OF REGION HORIZONTAL POSITIONING FACTOR IS INDICATED.

positioning_vertical_factor (8bits)     ALLOWABLE MAXIMUM VALUE OF REGION VERTICAL POSITIONING FACTOR IS INDICATED.

FIG. 11

TTML Styling (TTS)

```
<styling xmlns:tts="http://www.w3.org/ns/ttml#styling">
    <!-- s1 specifies default color, font, and text alignment -->
    <style xml:id="s1"
        tts:extent="560px 350px" tts:origin="480px 600px"
        tts:color="white"
        tts:fontFamily="proportionalSansSerif"
        tts:fontSize="22px"
        tts:textAlign="center"
        tts:scale_up_factor=" aa%"
        tts:scale_down_factor="bb%"
        tts:positioning_horizontal_factor="cc%"
        tts:positioning_vertical_factor="dd%"
    />
    <set bigin=" 0s" dur=" Xs" tts:opacity=" 1.0" />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

FIG. 12

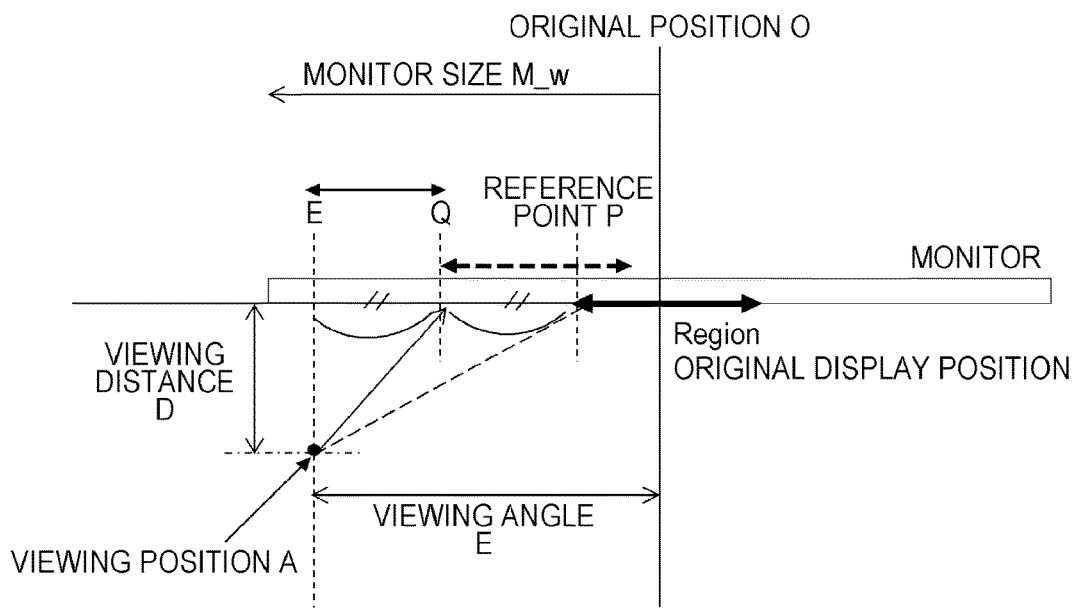

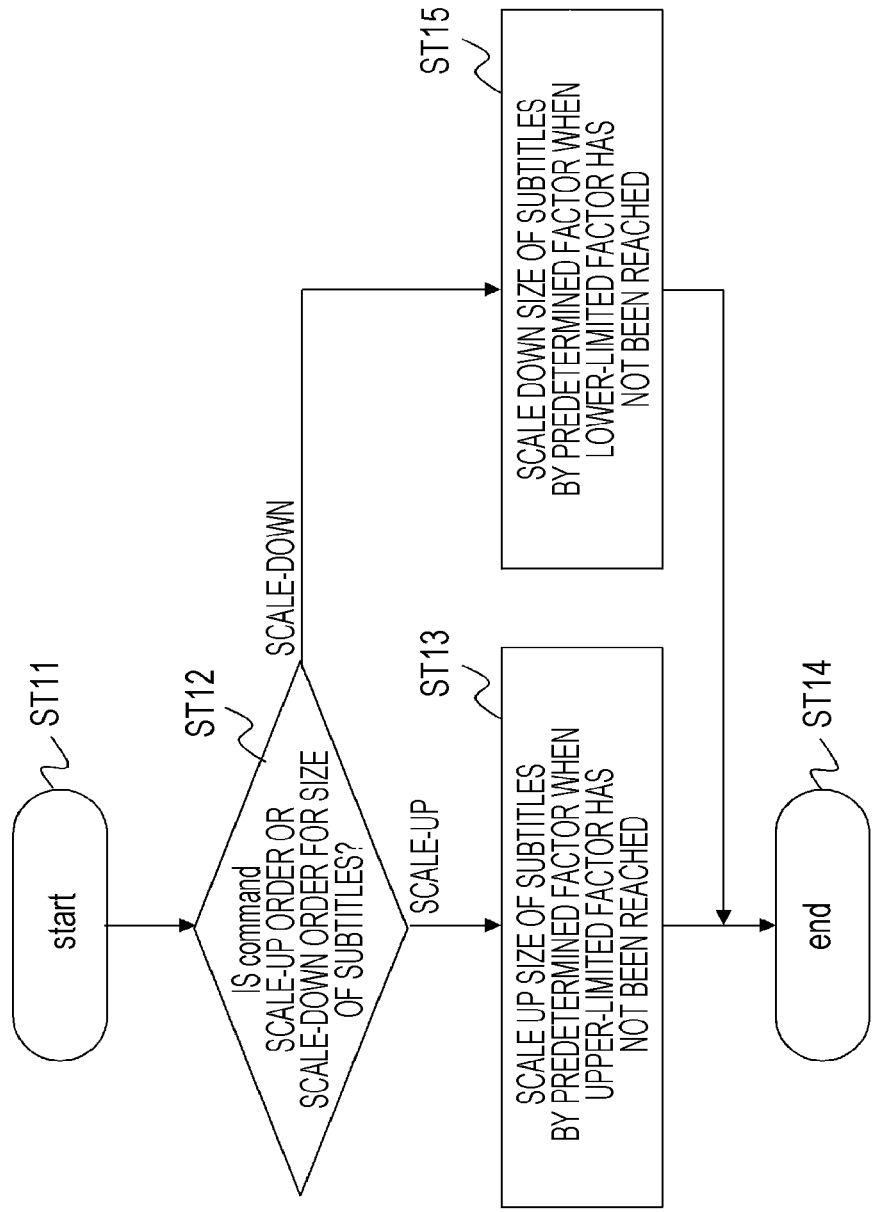

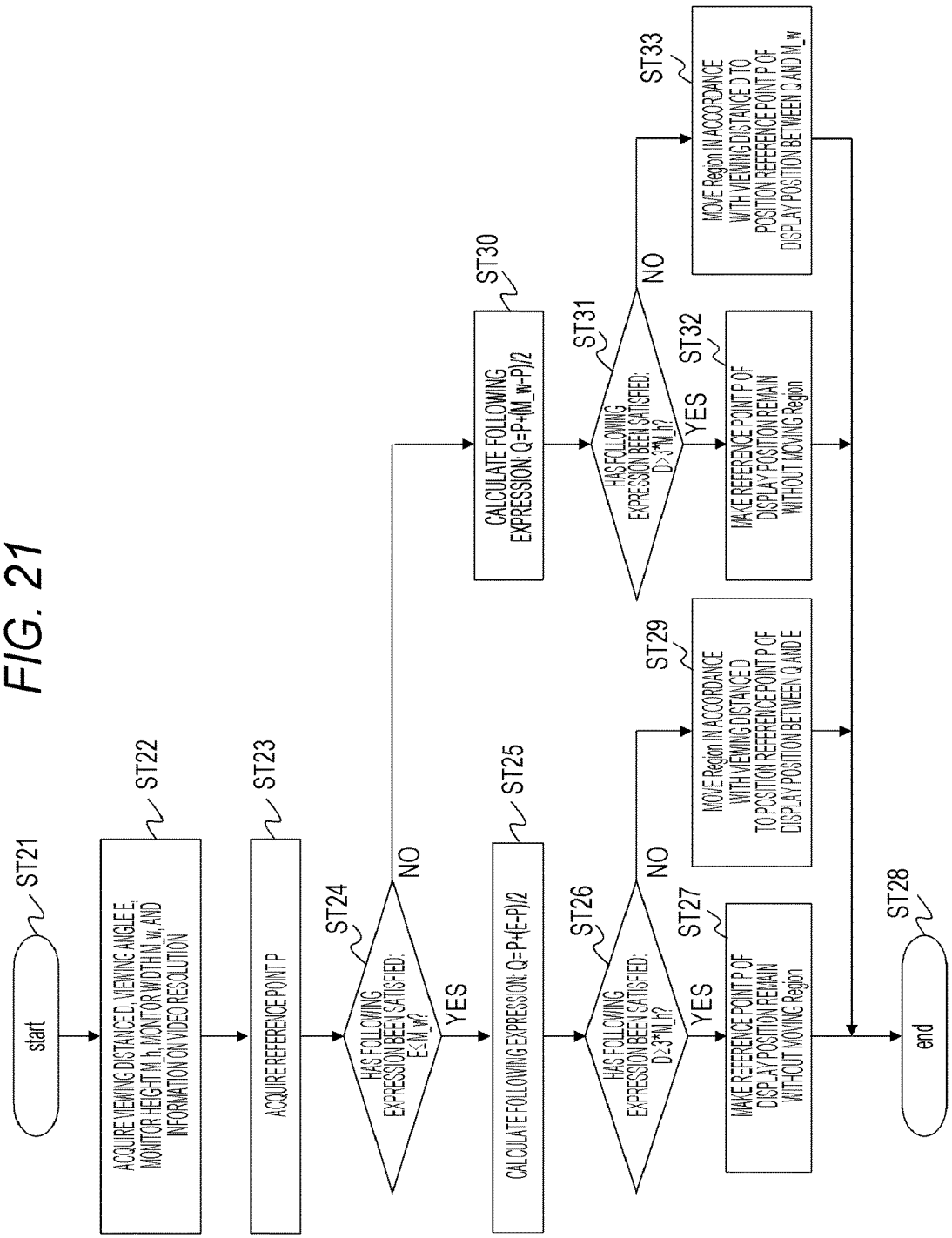

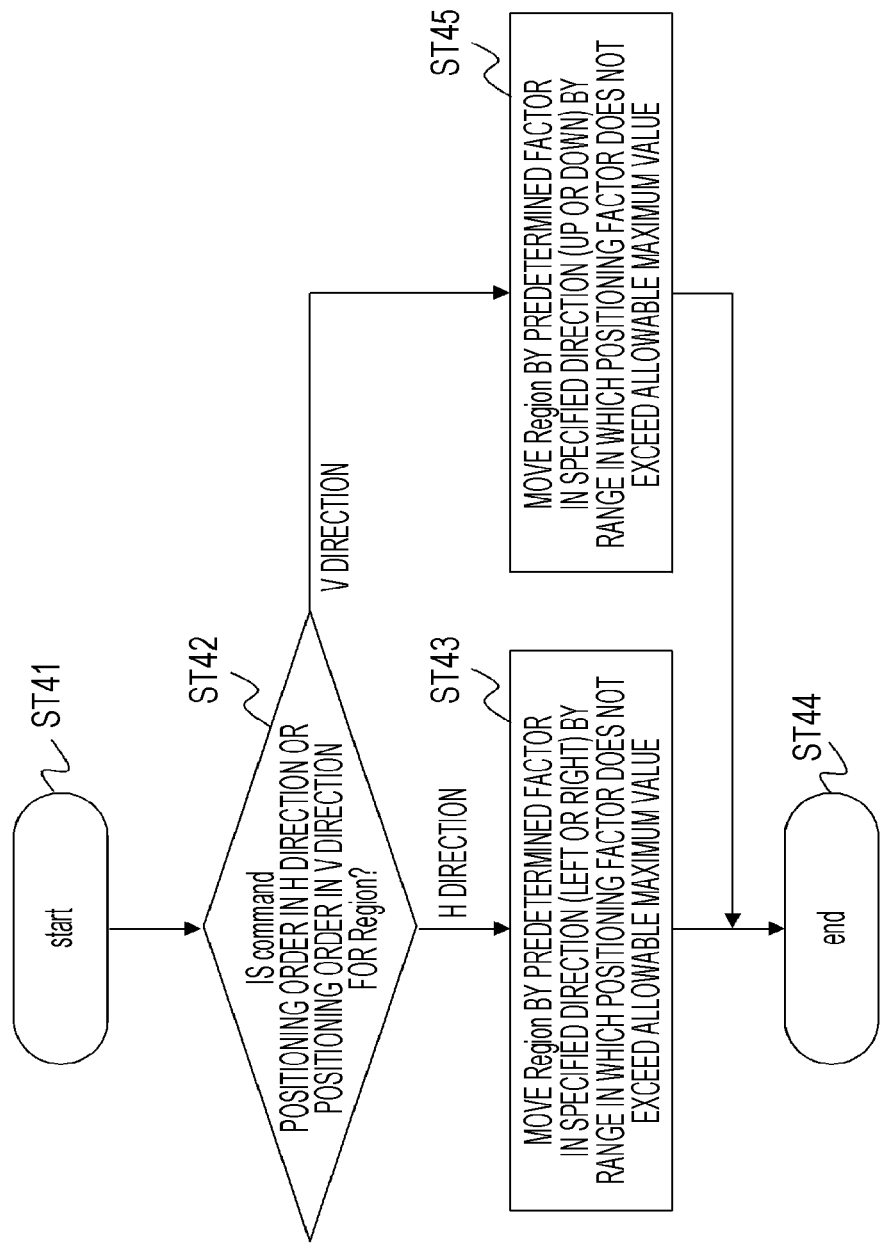

RECEPTION DEVICE, RECEPTION METHOD, TRANSMISSION DEVICE, AND TRANSMISSION METHOD

TECHNICAL FIELD

The present technology relates to a reception device, a reception method, a transmission device, and a transmission method, and more particularly relates to, for example, a reception device that superimposes and displays subtitles and graphics on video.

BACKGROUND ART

Conventionally, for example, management of transmitting subtitle data in bitmap data has been performed in broadcasting, such as digital video broadcasting (DVB). Recently, transmitting information on subtitles, in a character code of text, namely, on a text basis, has been proposed (refer to Patent Document 1).

CITATION LIST

Patent Document

Patent Document 1: Japanese Patent Application Laid-Open No. 2012-169885

SUMMARY OF THE INVENTION

Problems to be Solved by the Invention

A conventional method of transmitting subtitles (captions) is on the premise that data is sent having precision dependent on the resolution of video being a background, and thus a display is performed in accordance with the premise. It is desired that the position and size of the subtitles superimposed and displayed on the video, can be corrected on the basis of the size of a monitor screen or the viewing position of a viewer, on the reception side.

An object of the present technology is to enable subtitles (graphics) to be superimposed and displayed on video.

Solutions to Problems

According to a concept of the present technology, a reception device includes: a reception unit configured to receive a container in a predetermined format, the container including a video stream having video data and a subtitle stream having subtitle data; and a control unit configured to control video decode processing of decoding the video stream to acquire the video data, subtitle decode processing of decoding the subtitle stream to acquire bitmap data of subtitles, subtitle processing of performing processing of correcting at least one of a size of the subtitles and a display position of the subtitles to the bitmap data of the subtitles, and video superimposition processing of superimposing the bitmap data of the subtitles to which the processing has been performed, on the video data.

According to the present technology, the reception unit receives the container in the predetermined format, the container including the video stream having the video data and the subtitle stream having the subtitle data. The control unit controls the video decode processing, the subtitle decode processing, the subtitle processing, and the video superimposition processing. The video stream is decoded to acquire the video data, in the video decode processing. The subtitle stream is decoded to acquire the bitmap data of the subtitles, in the subtitle decode processing.

The processing of correcting the at least one of the size of the subtitles and the display position of the subtitles is performed to the bitmap data of the subtitles, in the subtitle processing. In addition, the bitmap data of the subtitles to which the processing has been performed, is superimposed on the video data, in the video superimposition processing.

According to the present technology in this manner, the processing of correcting the at least one of the size of the subtitles and the display position of the subtitles, can be performed to the bitmap data of the subtitles so that the subtitles can be favorably superimposed and displayed on the video.

Note that, according to the present technology, for example, the at least one of the size of the subtitles and the display position of the subtitles may be automatically corrected on the basis of viewing position information and monitor size information, in the subtitle processing. The automatic correction is performed in this manner so that the size or display position of the subtitles can be brought into an appropriate state with a user, such as a viewer, not required to perform a time-consuming operation.

In this case, for example, an information acquisition unit that acquires the viewing position information, may be further provided. In addition, in this case, for example, in the subtitle processing, the following expression may be calculated: $R=D/(M\_h*f)$, the D representing a viewing distance, the M\_h representing a height of a monitor, the f representing a value dependent on resolution of a video, to perform scale-down correction to the size of the subtitles when the R is smaller than a first threshold value, and to perform scale-up correction to the size of the subtitles when the R is larger than a second threshold value larger than the first threshold value.

In addition, in this case, for example, in the subtitle processing, when a viewing horizontal position is present outer than an end point of a region in a horizontal direction, the region being an area on which the subtitles are displayed, a position of the region may be moved to the viewing horizontal position in the horizontal direction in accordance with a distance from the end point to the viewing horizontal position, to automatically correct the display position of the subtitles. In addition, in this case, for example, in the subtitle processing, when a viewing vertical position is present outer than an end point of the region in a vertical direction, the region being the area on which the subtitles are displayed, the position of the region may be moved to the viewing vertical position in the vertical direction in accordance with a distance from the end point to the viewing vertical position, to automatically correct the display position of the subtitles.

In addition, according to the present technology, for example, the at least one of the size of the subtitles and the display position of the subtitles may be corrected on the basis of a user operation, in the subtitle processing. In this case, the user, such as the viewer, can bring the size or display position of the subtitles into a desired state.

In addition, according to the present technology, for example, the correction of the at least one of the size and display position of the subtitles may be limited within an allowable range, in the subtitle processing. The correction is limited within the allowable range in this manner so that excessive correction can be avoided being performed.

In this case, for example, an information extraction unit that extracts allowable range information on the correction from a layer of the subtitle stream, may be further provided, the allowable range information on the correction being inserted into the layer of the subtitle stream. In the subtitle processing, the correction may be limited within the allowable range on the basis of the allowable range information that has been extracted. In this case, the allowable range information inserted into the layer of the subtitle stream is used so that the limitation of the size correction or the display position correction of the subtitles can be appropriately performed.

In addition, according to a different concept of the present technology, a transmission device includes: a transmission unit configured to transmit a container in a predetermined format, the container including a video stream having video data and a subtitle stream having subtitle data; and an information insertion unit configured to insert at least one of a piece of information indicating an allowable range of size correction of subtitles and a piece of information indicating an allowable range of display position correction of the subtitles, into a layer of the subtitle stream.

According to the present technology, the transmission unit transmits the container in the predetermined format, the container including the video stream having the video data and the subtitle stream having the subtitle data. The information insertion unit inserts the at least one of the piece of information indicating the allowable range of the size correction of the subtitles and the piece of information indicating the allowable range of the display position correction of the subtitles, into the layer of the subtitle stream.

According to the present technology in this manner, the correction allowable range information on the size or display position of the subtitles, is inserted into the layer of the subtitle stream. Therefore, the size correction or the display position correction of the subtitles can be appropriately limited with the correction allowable range information, on the reception side.

In addition, according to a different concept of the present technology, a reception device includes: a reception unit configured to receive a container in a predetermined format, the container including a video stream having video data and a graphics stream having graphics data; and a control unit configured to control video decode processing of decoding the video stream to acquire the video data, graphics decode processing of decoding the graphics stream to acquire bitmap data of graphics, graphics processing of performing processing of correcting at least one of a size of the graphics and a display position of the graphics to the bitmap data of the graphics, and video superimposition processing of superimposing the bitmap data of the graphics to which the processing has been performed, on the video data.

In addition, according to a different concept of the present technology, a transmission device includes: a transmission unit configured to transmit a container in a predetermined format, the container including a video stream having video data and a graphics stream having graphics data; and an information insertion unit configured to insert at least one of a piece of information indicating an allowable range of size correction of graphics and a piece of information indicating an allowable range of display position correction of the graphics, into a layer of the graphics stream.

EFFECTS OF THE INVENTION

According to the present technology, the subtitles can be favorably superimposed and displayed on the video. Note that the effects described in the present specification are, but are not limited to, just exemplifications, and thus additional effects may be provided.

BRIEF DESCRIPTION OF DRAWINGS

FIG. 3 is a table of a TTML structure.

FIG. 4 illustrates exemplary structures of the respective elements of metadata (metadata), styling (styling), and layout (layout) present in a header (head) of the TTML structure.

FIG. 5 is a diagram for describing the start position and end position of a region.

FIG. 6 is a table of an exemplary structure of body (body) in the TTML structure.

FIG. 7 is a table of an exemplary structure of a page composition segment.

FIG. 8 is a table of an exemplary structure of a region composition segment.

FIG. 9 is a table of an exemplary structure of a CLUT definition segment.

FIG. 10 illustrates a table of an exemplary structure of a region scaling segment into which information indicating allowable ranges of size correction and display position correction of subtitles has been inserted and a table of the descriptions of main information in the exemplary structure.

FIG. 11 is a table of an exemplary structure of the styling (TTS) into which the information indicating the allowable ranges of the size correction and the display position correction of the subtitles has been inserted.

FIG. 12 is a diagram for describing automatic correction of the position of the region (the display position of the subtitles) on the reception side.

FIG. 20 is a flowchart of exemplary correction processing of the size of the subtitles in the size/position conversion unit based on a user operation.

FIG. 21 is a flowchart of exemplary automatic correction processing of the display position of the subtitles in the size/position conversion unit.

FIG. 22 is a flowchart of exemplary correction processing of the display position of the subtitles in the size/position conversion unit based on the user operation.

MODE FOR CARRYING OUT THE INVENTION

A mode for carrying out the invention (hereinafter, referred to as an "embodiment") will be described below. Note that the descriptions will be given in the following order.

1. Embodiment
2. Modification

<1. Embodiment>

[Exemplary Configuration of Transmission and Reception System]

Figure 1:
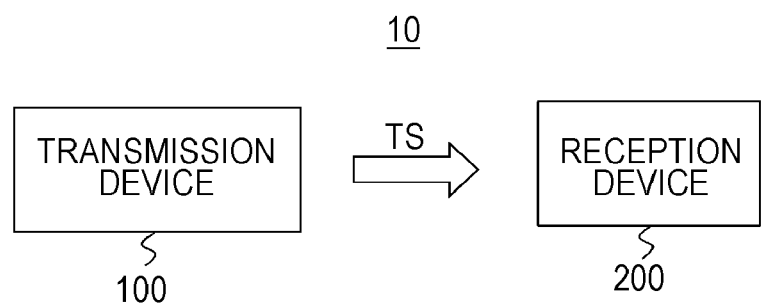
FIG. 1 is a block diagram of an exemplary configuration of a transmission and reception system according to an embodiment.

FIG. 1 illustrates an exemplary configuration of a transmission and reception system 10 according to the embodiment. The transmission and reception system 10 includes a transmission device 100 and a reception device 200.

The transmission device 100 generates a transport stream TS of MPEG2 as a container and disposes the transport stream TS onto a packet of a broadcast wave or a net so as to transmit the transport stream TS. The transport stream TS includes a video stream having video data (image data).

In addition, the transport stream TS includes a subtitle stream having subtitle data (caption data). Here, the subtitle data includes text information on subtitles in a predetermined format or bitmap data of the subtitles. Information indicating allowable ranges of size correction and display position correction of the subtitles, is inserted into a layer of the subtitle stream.

The reception device 200 receives the transport stream TS transmitted from the transmission device 100. The reception device 200 performs decode processing to the video stream so as to acquire the video data, and additionally performs decode processing to the subtitle stream so as to acquire the bitmap data of the subtitles.

The reception device 200 performs processing of correcting the size and display position of the subtitles, to the bitmap data of the subtitles. Then, the reception device 200 superimposes the bitmap data of the subtitles to which the processing of the size correction and the display position correction has been performed, on the video data so as to acquire display video data.

The reception device 200 automatically performs the correction processing on the basis of viewing position information and monitor size information. In addition, the reception device 200 performs the correction processing on the basis of a user operation of, for example, a viewer. The reception device 200 limits the corrections of the size and display position of the subtitles, within the allowable ranges.

The reception device 200 extracts the information indicating the allowable ranges of the size correction and the display position correction of the subtitles from the layer of the subtitle stream and uses the information in performing the limitations. When the correction allowable range information cannot be extracted from the layer of the subtitle stream, the reception device 200 uses information set as a default.

[Exemplary Configuration of Transmission Device]

Figure 2:
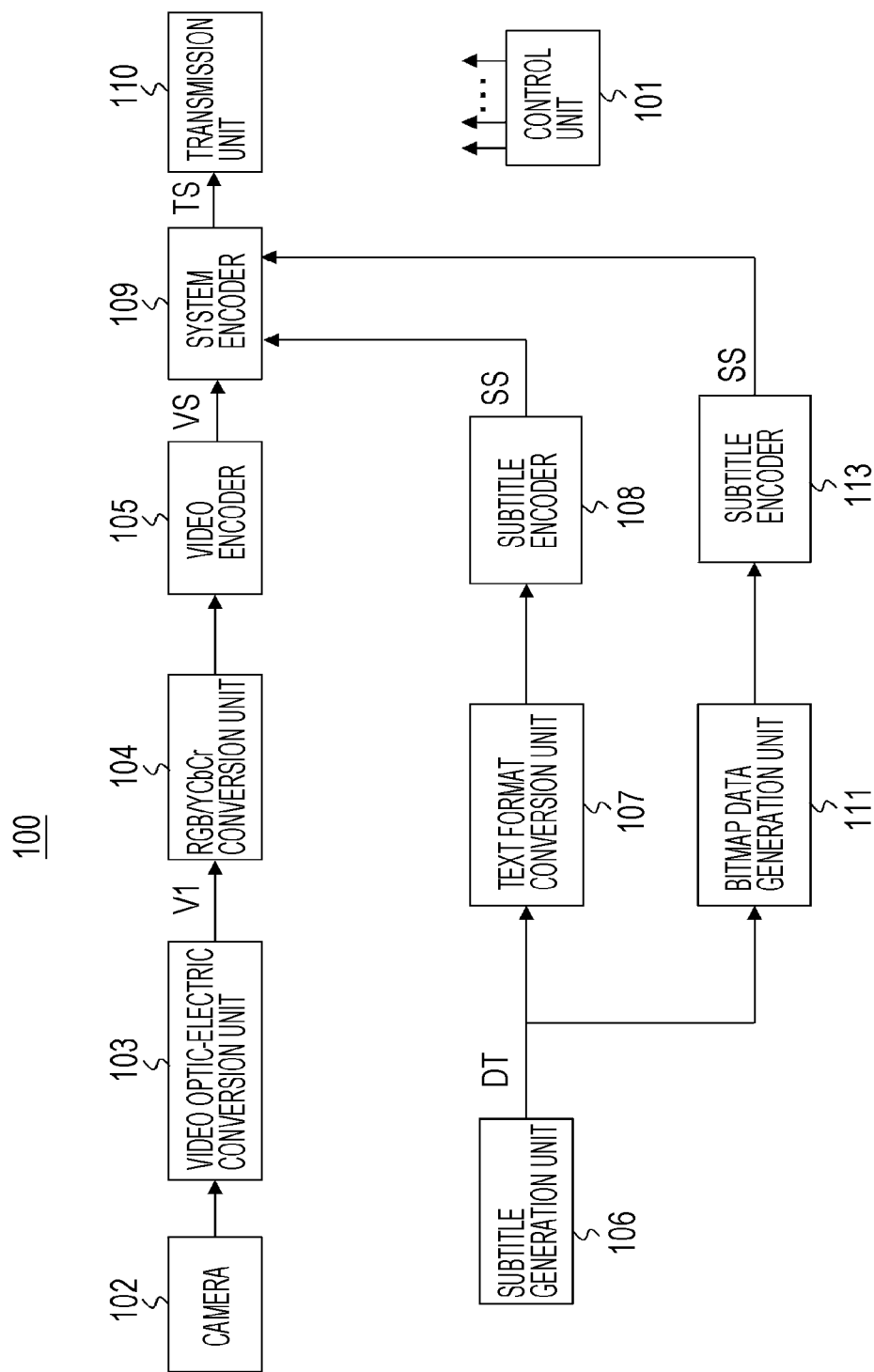
FIG. 2 is a block diagram of an exemplary configuration of a transmission device.

FIG. 2 illustrates an exemplary configuration of the transmission device 100. The transmission device 100 includes a control unit 101, a camera 102, a video optic-electric conversion unit 103, an RGB/YCbCr conversion unit 104, a video encoder 105, a subtitle generation unit 106, a text format conversion unit 107, a subtitle encoder 108, a system encoder 109, and a transmission unit 110.

Note that, in a case where transmitting, as the subtitle data, the bitmap data of the subtitles instead of transmitting, as the subtitle data, the text information on the subtitles, the transmission device 100 includes a bitmap data generation unit 111 and a subtitle encoder 113 instead of including the text format conversion unit 107 and the subtitle encoder 108.

The control unit 101 includes a central processing unit (CPU), and controls the operation of each unit of the transmission device 100 on the basis of control programs. The camera 102 captures a subject so as to output the video data (the image data). The video optic-electric conversion unit 103 performs optic-electric conversion to the video data acquired by the camera 102 so as to acquire transmission video data V1.

The RGB/YCbCr conversion unit 104 converts the transmission video data from an RGB domain into an YCbCr (luminance/chrominance) domain. For example, the video encoder 105 performs encoding, such as MPEG4-AVC or HEVC, to the transmission video data V1 converted into the YCbCr domain, so as to generate the video stream (a PES stream) VS including encoded video data.

The subtitle generation unit 106 generates text data (a character code) DT as subtitle information. The text format conversion unit 107 receives the text data DT so as to acquire the text information on the subtitles in the predetermined format, namely, timed text markup language (TTML) in the present embodiment.

FIG. 3 illustrates an exemplary timed text markup language (TTML) structure. The TTML is described on an XML basis. In the illustrated example, a subtitle display current area is specified with "tts:extent" at the position of a root container (root container). For example, the respective elements of metadata (metadata), styling (styling), and layout (layout) are present in a header (head). FIG. 4(a) illustrates an exemplary structure of the metadata (TTM: TTML Metadata). The metadata includes information on a title of the metadata and information on a copyright.

FIG. 4(b) illustrates an exemplary structure of the styling (TTS: TTML Styling). The styling includes information, such as the position and size of a region (Region), a color (color), a font (fontFamily), a font size (fontSize), and a text alignment (textAlign), in addition to an identifier (id).

"tts:origin" specifies, with pixel counts, the start position of the region (Region) being a display area of the subtitles. "tts:origin'480px 600px'" is set in the example, and, as illustrated in FIG. 5, the start position is indicated with (480, 600). In addition, "tts:extent" specifies, with offset pixel counts from the start position in a horizontal direction and in a vertical direction, the end position of the region. "tts:extent'560px 350px'" is set in the example, and the end position is indicated with (480+560, 600+350). Here, the offset pixel counts correspond to the horizontal and vertical sizes of the region.

"tts:opacity='1.0'" indicates the mixing ratio of the subtitles (captions) and background video. For example, "1.0" indicates that the subtitles account for 100% and the background video accounts for 0%, and "0.1" indicates that the subtitles (the captions) account for 0% and the background video accounts for 100%. "1.0" is set in the illustrated example.

FIG. 4(c) illustrates an exemplary structure of the layout (TTML layout). The layout includes information, such as an offset (padding), a background color (backgroundColor), and an alignment (displayAlign), in addition to the identifier (id) of the region in which the subtitles are arranged. Note that information on the position and size of the region (Region) may be included in the layout.

FIG. 6 illustrates an exemplary structure of body (body). Information on three subtitles including a subtitle 1 (subtitle 1), a subtitle 2 (subtitle 2), and a subtitle 3 (subtitle 3), is included in the illustrated example. Per subtitle, display start timing and display end timing are described and additionally text data is described. For example, for the subtitle 1 (subtitle 1), the display start timing is set to "0.76 s", the display end timing is set to "3.45 s", and the text data is set to "It seems a paradox, dose it not,".

Referring back to FIG. 2, the subtitle encoder 108 converts the TTML acquired by the text format conversion unit 107, into various segments, and generates the subtitle stream SS including a PES packet including the segments arranged in a payload.

In addition, the bitmap data generation unit 111 receives the text data DT generated by the subtitle generation unit 106 so as to generate the bitmap data of the subtitles. The subtitle encoder 113 converts the bitmap data of the subtitles and display control information into various segments, and generates the subtitle stream SS including a PES packet including the segments arranged in a payload.

In this case, a page composition segment (page_composition_segment) includes information on the start position of the region (Region) being the display area of the subtitles. FIG. 7 illustrates an exemplary structure (Syntax) of the page composition segment that has been conventionally known. The field of "region_horizontal_address" and the field of "region_vertical_address" indicate the start position of the region (Region).

In addition, in this case, a region composition segment (region_composition_segment) includes information indicating the horizontal and vertical sizes of the region. FIG. 8 illustrates an exemplary structure (Syntax) of the region composition segment that has been conventionally known. The field of "region_width" and the field of "region_height" indicate the horizontal and vertical sizes of the region.

In addition, in this case, a CLUT definition segment (CLUT_definition_segment) includes information indicating the mixing ratio of the subtitles (the captions) and the background video. FIG. 9 illustrates an exemplary structure (Syntax) of the CLUT definition segment that has been conventionally known. The field of "T-value" indicates the mixing ratio of the subtitles and the background video.

Referring back to FIG. 2, the system encoder 109 generates the transport stream TS including the video stream VS generated by the video encoder 105 and the subtitle stream SS generated by the subtitle encoder 108 or the subtitle encoder 113. The transmission unit 110 disposes the transport stream TS onto the packet of the broadcast wave or the net so as to transmit the transport stream TS to the reception device 200.

Here, the transmission device 100 inserts, as described above, the information indicating the allowable ranges of the size correction and the display position correction of the subtitles, into the layer of the subtitle stream SS. In a case where the bitmap data of the subtitles is transmitted as the subtitle data, namely, in a case where the transport stream TS includes the subtitle stream SS generated by the subtitle encoder 113, for example, a segment including the information indicating the allowable ranges of the size correction and the display position correction of the subtitles, is inserted into the subtitle stream SS.

FIG. 10(a) illustrates an exemplary structure (syntax) of a region scaling segment (Region_scaling_Segment) to be newly defined, and FIG. 10(b) illustrates the descriptions (Semantics) of main information in the exemplary structure. The segment includes information on "sync_byte", "segment_type", "page_id", "segment_length", "region_id", "scale_up_factor", "scale_down_factor", "positioning_horizontal_factor", and "positioning_vertical_factor", present.

The 8-bit field of the "segment_type" indicates a segment type, and represents here the region scaling segment. The 8-bit field of the "segment_length" indicates the length (the size) of the segment. The 8-bit field of the "region_id" indicates an identifier that identifies the region.

The 8-bit field of the "scale_up_factor" indicates the allowable maximum value of a region scale-up factor. The 8-bit field of the "scale_down_factor" indicates the allowable minimum value of a region scale-down factor. The information on the "scale_up_factor" and the "scale_down_factor" is included in the information indicating the allowable range of the size correction of the subtitles.

The 8-bit field of the "positioning_horizontal_factor" indicates the allowable maximum value of a region horizontal positioning factor. The 8-bit field of the "positioning_vertical_factor" indicates the allowable maximum value of a region vertical positioning factor. The information on the "positioning_horizontal_factor" and the "positioning_vertical_factor" is included in the information indicating the allowable range of the display position correction of the subtitles.

In addition, in a case where the text information on the subtitles is transmitted as the subtitle data, namely, in a case where the transport stream TS includes the subtitle stream SS generated by the subtitle encoder 108, for example, the information indicating the allowable ranges of the size correction and the display position correction of the subtitles is inserted with the element of the styling (TTS).

FIG. 11 illustrates an exemplary structure of the styling (TTS) in that case. "tts:scale_up_factor" indicates the allowable maximum value of the region scale-up factor. The illustrated example indicates that the allowable maximum value is "aa %". "tts:scale_down_factor" indicates the allowable minimum value of the region s scale-down factor. The illustrated example indicates that the allowable maximum value is "bb %".

"tts:positioning_horizontal_factor" indicates the allowable maximum value of the region horizontal positioning factor. The illustrated example indicates that the allowable maximum value is "cc %". "tts:positioning_vertical_factor" indicates the allowable maximum value of the region vertical positioning factor. The illustrated example indicates that the allowable maximum value is "dd %".

Note that, with the detailed description omitted, in a case where the text information on the subtitles is transmitted as the subtitle data, it is considered that the information indicating the allowable ranges of the size correction and the display position correction of the subtitles is inserted with the element of the layout instead of using the element of the styling (TTS) as described above.

Automatic correction of the position of the region on the reception side, namely, of the display position of the subtitles, will be described here. Here, the automatic correction in the horizontal direction will be described. FIG. 12 illustrates an exemplary case where a viewing angle E (a viewing horizontal position) at a viewing position A is a monitor size M_w or less. Here, the monitor size M_w indicates a width from an original position O to an end portion on the left side of a monitor in the horizontal direction, the original position O being the center of the original display position of the region in the horizontal direction.

Figure 13:
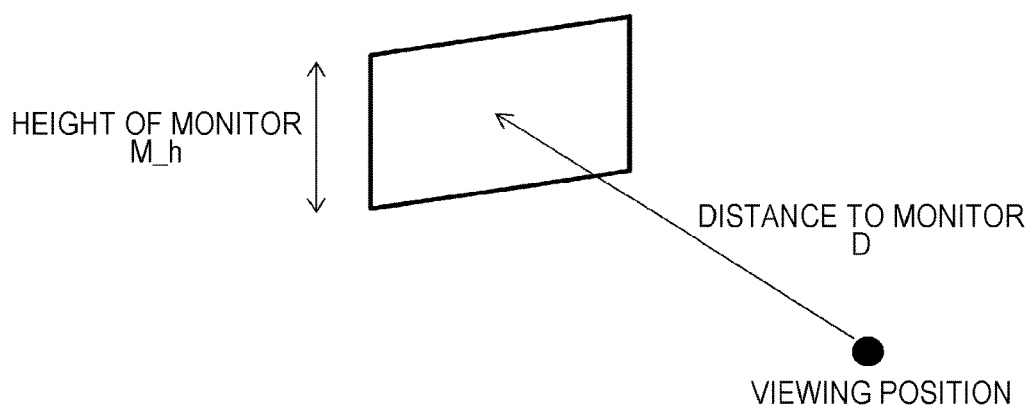
FIG. 13 is a diagram of a viewing distance D and a height of a monitor M_h.

With, as a reference point P, an end portion of the original display position of the region on the viewing position side in the horizontal direction, the following expression is calculated: Q=(E−P)/2. When a viewing distance D is an appropriate viewing distance (=3*M_h) or more, the region is not moved and the reference point P of the display position remains. Meanwhile, when the viewing distance D is less than the appropriate viewing distance, the region is moved in accordance with the viewing distance D so that the reference point P of the display position is positioned between the Q and the E. In this case, as the viewing distance D decreases, the E is more approached. Note that the M_h is the height of the monitor as illustrated in FIG. 13.

The example illustrated in FIG. 12 illustrates a case where the position of the viewing position A in the horizontal direction is on the left side of the original position O. With the detailed description omitted, the position of the region is automatically corrected similarly even in a case where the position of the viewing position A in the horizontal direction is on the right side of the original position O.

Figure 14:
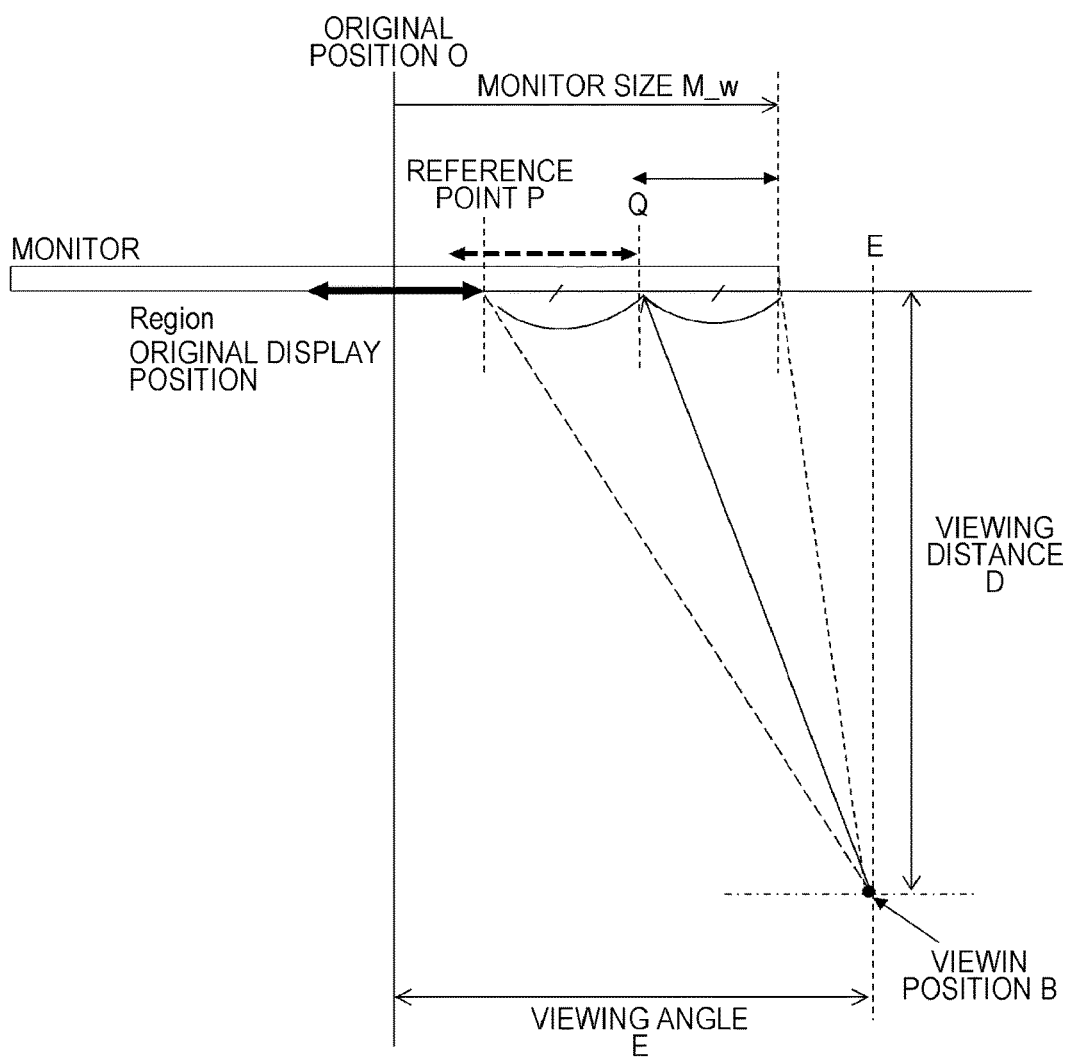
FIG. 14 is a diagram for describing the automatic correction of the position of the region (the display position of the subtitles) on the reception side.

In addition, FIG. 14 illustrates an exemplary case where the viewing angle E (the viewing horizontal position) at a viewing position B is larger than the monitor size M_w. Here, the monitor size M_w illustrates a width from the original position O to an end portion on the right side of the monitor in the horizontal direction, the original position O being the center of the original display position of the region in the horizontal direction.

With, as the reference point P, an end portion of the original display position of the region on the viewing position side in the horizontal direction, the following expression is calculated: Q=(M_w−P)/2. When the viewing distance D is the appropriate viewing distance (=3*M_h) or more, the region is not moved and the reference point P of the display position remains. Meanwhile, when the viewing distance D is less than the appropriate viewing distance, the region is moved in accordance with the viewing distance D so that the reference point P of the display position is positioned between the Q and the M_w. In this case, as the viewing distance D decreases, the M_w is more approached.

The example illustrated in FIG. 14 illustrates a case where the position of the viewing position B in the horizontal direction is on the right side of the original position O. With the detailed description omitted, the position of the region is automatically corrected similarly even in a case where the position of the viewing position B in the horizontal direction is on the left side of the original position O.

As illustrated in FIG. 12, in a case where the viewing angle E at the viewing position A is smaller than the monitor size M_w, a horizontal positioning factor indicating the reference point P is 0%, a horizontal positioning factor indicating the position Q is 50%, and a horizontal positioning factor indicating the position E is 100%. In addition, as illustrated in FIG. 14, in a case where the viewing angle E at the viewing position B is larger than the monitor size M_w, a horizontal positioning factor indicating the reference point P is 0%, a horizontal positioning factor indicating the position Q is 50%, and a horizontal positioning factor indicating the position M_w is 100%.

The allowable maximum value of the region horizontal positioning factor indicates, for example, the maximum value allowed by the horizontal positioning factor defined in this manner. In this case, the allowable maximum value of the region horizontal positioning factor can have a value of 0% at a minimum and a value of 100% at a maximum.

Note that, with the detailed description omitted, the automatic correction of the position of the region in the vertical direction, namely, of the display position of the subtitles, is performed similarly to the case in the horizontal direction described above. In addition, the allowable maximum value of the region vertical positioning factor indicates the maximum value allowed by a vertical positioning factor defined similarly to the horizontal positioning factor described above.

Note that it is considered that the region horizontal positioning factor is defined as the positioning amount of the region to the size of the monitor in the horizontal direction. In this case, the allowable maximum value of the region horizontal positioning factor indicates the maximum value allowed by the horizontal positioning factor defined in this manner. Similarly, it is considered that the region vertical positioning factor is defined as the positioning amount of the region to the size of the monitor in the vertical direction. In this case, the allowable maximum value of the region vertical positioning factor indicates the maximum value allowed by the vertical positioning factor defined in this manner. The allowable maximum value of the region horizontal positioning factor and the allowable maximum value of the region vertical positioning factor are not limited by the viewing position.

[Exemplary Configuration of Transport Stream TS]

Figure 15:
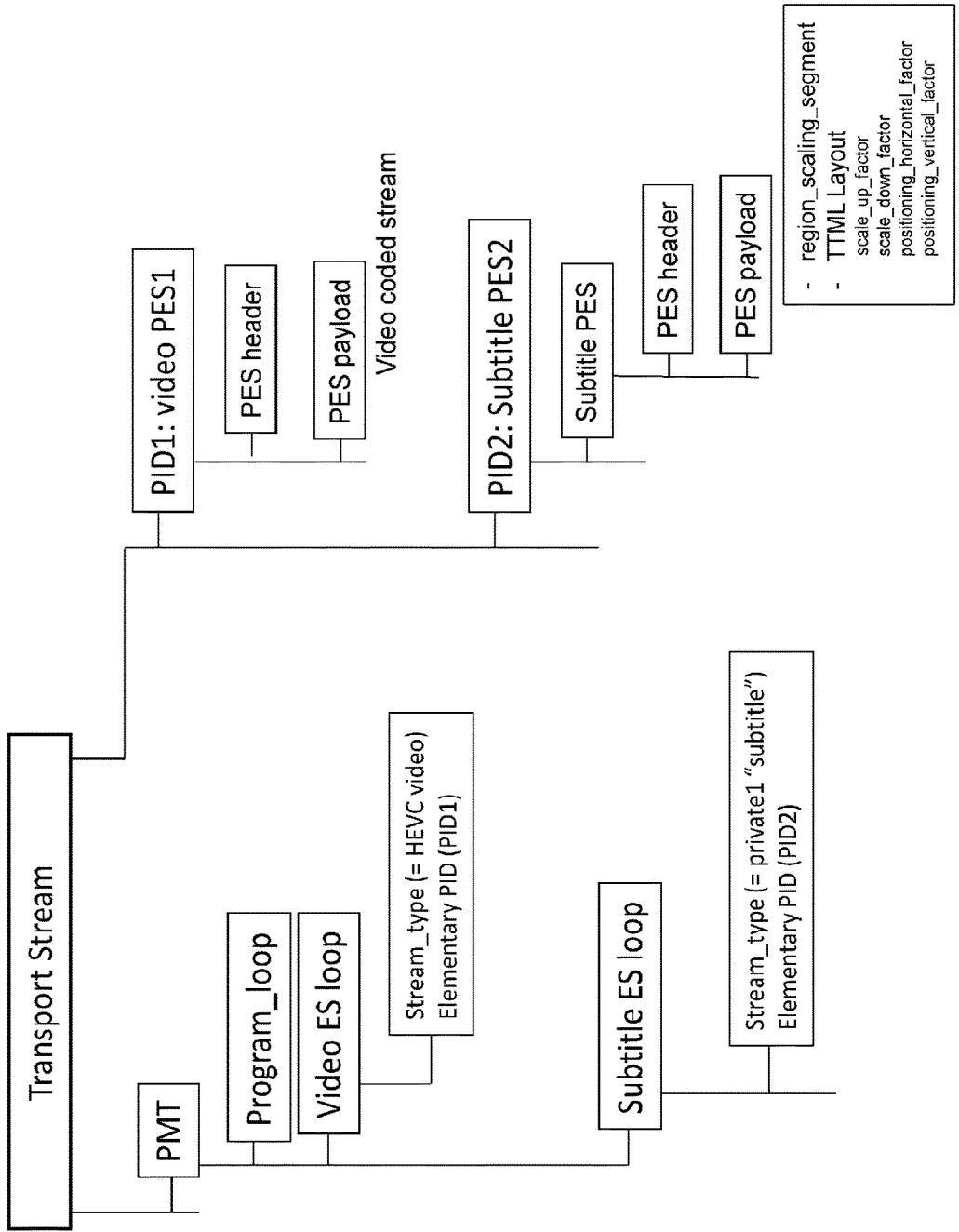
FIG. 15 is a diagram of an exemplary configuration of a transport stream TS.

FIG. 15 illustrates an exemplary configuration of the transport stream TS. A PES packet "Video PES1" of the video stream identified with a PID1, is present in the exemplary configuration. In addition, the PES packet "Subtitle PES2" of the subtitle stream identified with a PID2, is present in the exemplary configuration.

The PES packets each include a PES header (PES header) and a PES payload (PES payload). The PES packet of the video stream includes a video coded stream inserted into the PES payload. In addition, the PES packet of the subtitle stream includes the information indicating the allowable ranges of the size correction and the display position correction of the subtitles, inserted into the element of the styling (TTS) present in the header of the TTML structure or the region scaling segment.

In addition, the transport stream TS includes a program map table (PMT) as program specific information (PSI). The PSI includes information describing to which program each elementary stream included in the transport stream belongs. The PMT includes a program loop (Program loop) describing information relating to the entire programs, present.

In addition, the PMT includes an elementary stream loop including information relating to each elementary stream, present. The exemplary configuration includes a video elementary stream loop (video ES loop) corresponding to the video stream and a subtitle elementary stream loop (Subtitle ES loop) corresponding to the subtitle stream, present.

The video elementary stream loop (video ES loop) includes information, such as a stream type and a packet identifier (PID), arranged in response to the video stream and additionally includes a descriptor describing information relating to the video stream, arranged. The value of "Stream_type" of the video stream is set to, for example, a value indicating an HEVC video stream, and the PID information indicates the PID1 given to the PES packet "video PES1" of the video stream.

The subtitle elementary stream loop (Subtitle ES loop) includes information, such as a stream type and a PID (a packet identifier), arranged in response to the subtitle stream and additionally includes a descriptor describing information relating to the subtitle stream, arranged. The value of "Stream_type" of the subtitle stream is set to, for example, a value indicating a private stream, and the PID information indicates the PID2 given to the PES packet "Subtitle PES2" of the subtitle stream.

The operation of the transmission device 100 illustrated in FIG. 2 will be simply described. The video data (the image data) captured and acquired by the camera 102, is supplied to the video optic-electric conversion unit 103. The video optic-electric conversion unit 103 performs the optic-electric conversion to the video data acquired by the camera 102 so as to acquire the transmission video data V1.

The transmission video data V1 acquired by the video optic-electric conversion unit 103, is converted from the RGB domain into the YCbCr (the luminance/chrominance) domain by the RGB/YCbCr conversion unit 104, so as to be supplied to the video encoder 105. The video encoder 105 performs the encoding, such as MPEG4-AVC or HEVC, to the transmission video data V1 so as to generates the video stream (the PES stream) VS including the encoded video data.

The subtitle generation unit 106 generates the text data (the character code) DT as the subtitle information. In a case where the text information of the subtitles is transmitted as the subtitle data, the text data DT is supplied to the text format conversion unit 107.

The text format conversion unit 107 makes a conversion to the text information on the subtitles, including display timing, namely, the TTML, on the basis of the text data DT (refer to FIG. 3). The TTML is supplied to the subtitle encoder 108.

The subtitle encoder 108 converts the TTML acquired by the text format conversion unit 107, into the various segments, and generates the subtitle stream SS including the PES packet including the segments arranged in the payload.

In addition, in a case where the bitmap data of the subtitles is transmitted as the subtitle data, the text data DT generated by the subtitle generation unit 106 is supplied to the bitmap data generation unit 111.

The bitmap data generation unit 111 generates the bitmap data of the subtitles on the basis of the text data DT. The bitmap data of the subtitles is supplied to the subtitle encoder 113. The subtitle encoder 113 converts the transmission bitmap data M1 and the display control information into the various segments, and generates the subtitle stream SS including the PES packet including the segments arranged in the payload.

The video stream VS generated by the video encoder 105 is supplied to the system encoder 109. The subtitle stream SS generated by the subtitle encoder 108 or the subtitle encoder 113, is supplied to the system encoder 109. The system encoder 109 generates the transport stream TS including the video stream VS and the subtitle stream SS. The transmission unit 110 disposes the transport stream TS onto the packet of the broadcast wave or the net so as to transmit the transport stream TS to the reception device 200.

In addition, the transmission device 100 inserts the information indicating the allowable ranges of the size correction and the display position correction of the subtitles, into the layer of the subtitle stream SS. In a case where the bitmap data of the subtitles is transmitted as the subtitle data, the region scaling segment to be newly defined, including the information indicating the allowable ranges of the size correction and the display position correction of the subtitles, is inserted into the subtitle stream SS (refer to FIG. 10). In addition, in a case where the text information on the subtitles is transmitted as the subtitle data, for example, the information indicating the allowable ranges of the size correction and the display position correction of the subtitles, is inserted with the element of the styling (TTS) (refer to FIG. 11).

[Exemplary Configuration of Reception Device]

Figure 16:
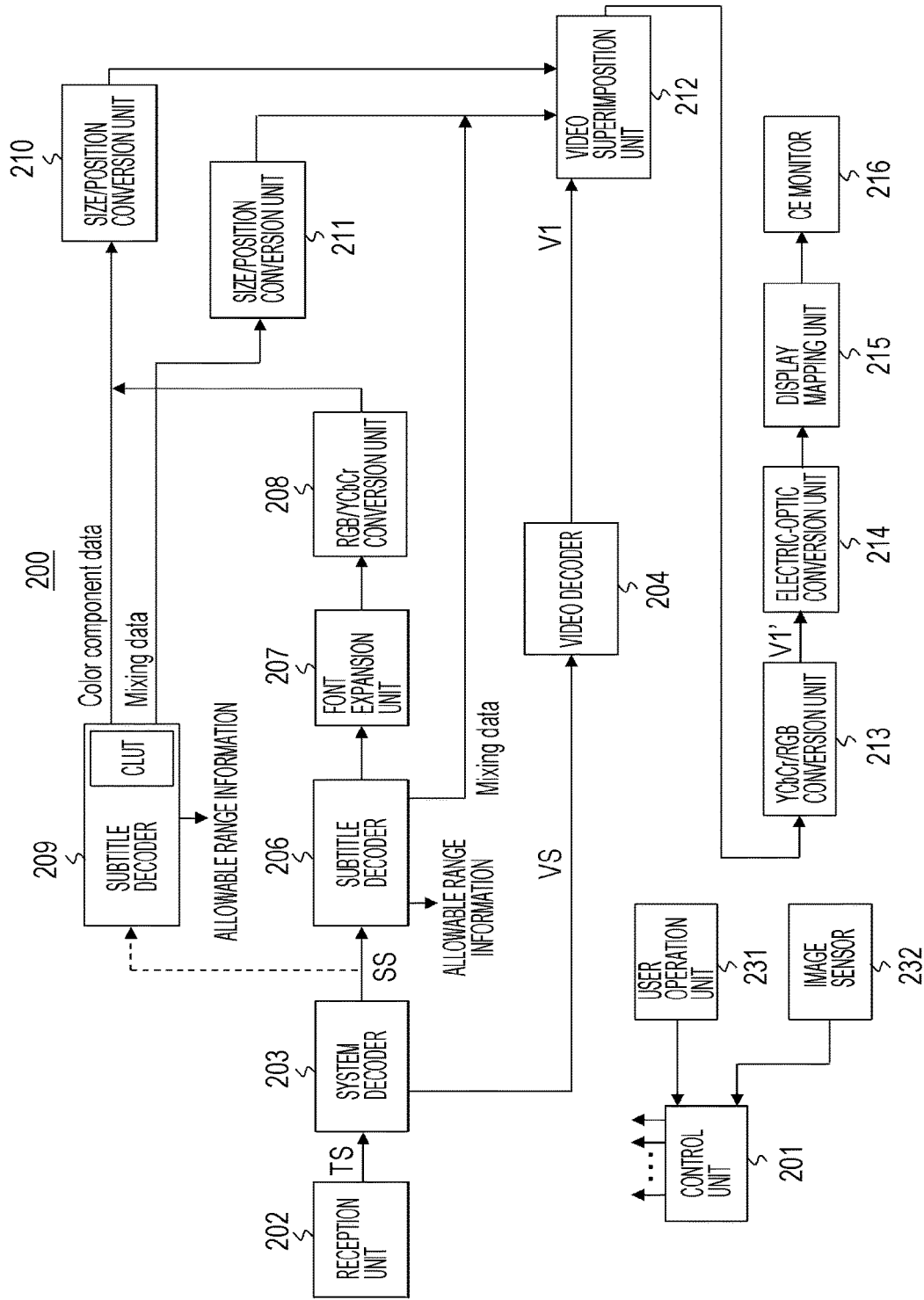
FIG. 16 is a block diagram of an exemplary configuration of a reception device.

FIG. 16 illustrates an exemplary configuration of the reception device 200. The reception device 200 includes a control unit 201, a reception unit 202, a system decoder 203, a video decoder 204, a subtitle decoder 206, a font expansion unit 207, an RGB/YCbCr conversion unit 208, and a subtitle decoder 209.

In addition, the reception device 200 includes a size/position conversion unit 210, a size/position conversion unit 211, a video superimposition unit 212, an YCbCr/RGB conversion unit 213, an electric-optic conversion unit 214, a display mapping unit 215, a CE monitor 216, a user operation unit 231, and an image sensor 232.

Figure 17:
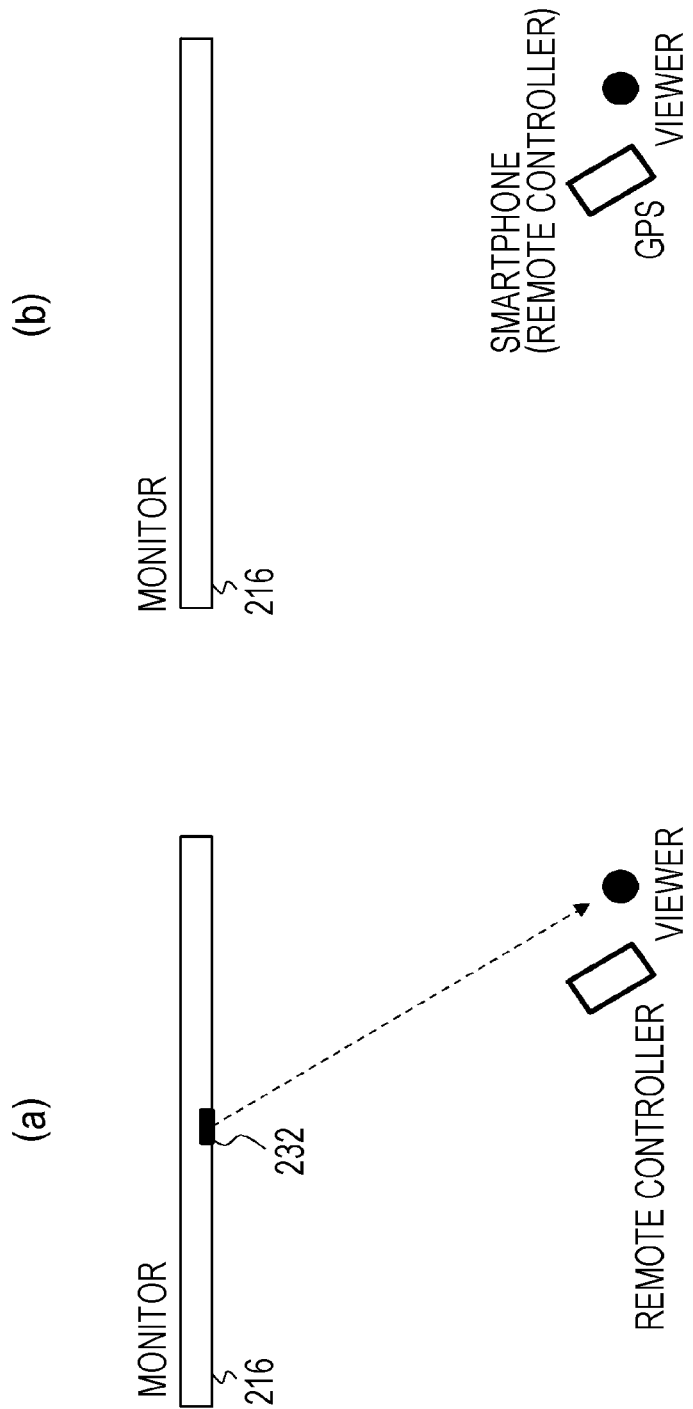
FIG. 17 illustrates diagrams each for describing a configuration of acquiring viewing position information.

The control unit 201 includes a central processing unit (CPU), and controls the operation of each unit of the reception device 200 on the basis of control programs. The user operation unit 231 includes, for example, switches, a touch panel, and a remote controller transmission unit with which a user, such as the viewer, performs various operations. As illustrated in FIG. 17(a), the image sensor 232 is arranged on the front side of the reception device 200, and acquires an image including the viewer in front of the monitor so as to send the image to the control unit 201.

The image sensor 232 together with the control unit 201 is included in an information acquisition unit that acquires the viewing position information. The control unit 201 analyzes the image acquired by the image sensor 232 and detects the viewer so as to acquire the viewing position information (the viewing distance D and the viewing angle E). Note that the configuration of acquiring the viewing position information is not limited to a configuration with the image sensor 232 in this manner. For example, as illustrated in FIG. 17(b), in a case where a smartphone having a position acquisition function of GPS is used as a remote controller, it is considered that position information acquired by the position acquisition function of the smartphone is used.

The reception unit 202 receives the transport stream TS transmitted from the transmission device 100, the transport stream TS being disposed on the packet of the broadcast wave or the net. The system decoder 203 extracts the video stream VS and the subtitle stream SS from the transport stream TS.

The video decoder 204 performs decoding processing to the video stream VS extracted by the system decoder 203 so as to output the transmission video data V1. In addition, the video decoder 204 extracts a parameter set and an SEI message inserted into each access unit included in the video stream VS so as to send the parameter set and the SEI message to the control unit 201.

The subtitle decoder 206 operates in a case where the text information on the subtitles is transmitted as the subtitle data. The subtitle decoder 206 performs decode processing to segment data of each region included in the subtitle stream SS, so as to acquire text data and a control code of each region. The control code includes mixing ratio information (Mixing data) on the subtitles and the background video, also present.

In addition, the subtitle decoder 206 extracts the information indicating the allowable ranges of the size correction and the display position correction of the subtitles, inserted into the subtitle stream SS, so as to send the information to the control unit 201. In this case, the information has been inserted with the element of the styling (TTS). With this arrangement, the control unit 201 recognizes the allowable maximum value of the region scale-up factor, the allowable minimum value of the region scale-down factor, the allowable maximum value of the region horizontal positioning factor, and the allowable maximum value of the region vertical positioning factor.

The font expansion unit 207 performs font expansion on the basis of the text data and the control code of each region acquired by the subtitle decoder 206, so as to acquire the bitmap data of each region. The bitmap data of the subtitles is acquired in the RGB domain. The RGB/YCbCr conversion unit 208 converts the bitmap data of the subtitles acquired by the font expansion unit 207, from the RGB domain into the YCbCr (the luminance/chrominance) domain.

The subtitle decoder 209 operates in a case where the bitmap data of the subtitles is transmitted as the subtitle data. In this case, the data included in the subtitle stream SS is transmitted to a CLUT. The subtitle decoder 209 performs decode processing to the subtitle stream SS so as to acquire the bitmap data of the subtitles and the mixing ratio information (Mixing data) on the subtitles and the background video.

In addition, the subtitle decoder 209 extracts the information indicating the allowable ranges of the size correction and the display position correction of the subtitles, inserted into the subtitle stream SS, so as to send the information to the control unit 201. In this case, the information has been inserted into the region scaling segment. With this arrangement, the control unit 201 recognizes the allowable maximum value of the region scale-up factor, the allowable minimum value of the region scale-down factor, the allowable maximum value of the region horizontal positioning factor, and the allowable maximum value of the region vertical positioning factor.

The size/position conversion unit 210 performs the processing of correcting the size and display position of the subtitles, to the bitmap data of the subtitles output from the RGB/YCbCr conversion unit 208 or the subtitle decoder 209.

The size/position conversion unit 210 automatically performs the correction processing, on the basis of the viewing position information and the monitor size information, under the control of the control unit 201. In addition, the size/position conversion unit 210 performs the correction processing on the basis of the user operation of, for example, the viewer. In this case, the size/position conversion unit 210 further receives correction with the user operation after performing the automatic correction.

Alternatively, the size/position conversion unit 210 can bring the automatic correction into a stop state, with the user operation, and receives only the correction with the user operation in that case. In addition, alternatively, the size/position conversion unit 210 can bring the correction with the user operation, into a rejection state, and performs only the automatic correction in that case.

The size/position conversion unit 210 limits the corrections of the size and display position of the subtitles, within the allowable ranges. Here, the information indicating the allowable ranges, extracted from the subtitle stream SS, is basically used. However, when the information indicating the allowable ranges is not extracted from the subtitle stream SS, the information set as the default is used.

Figure 18:
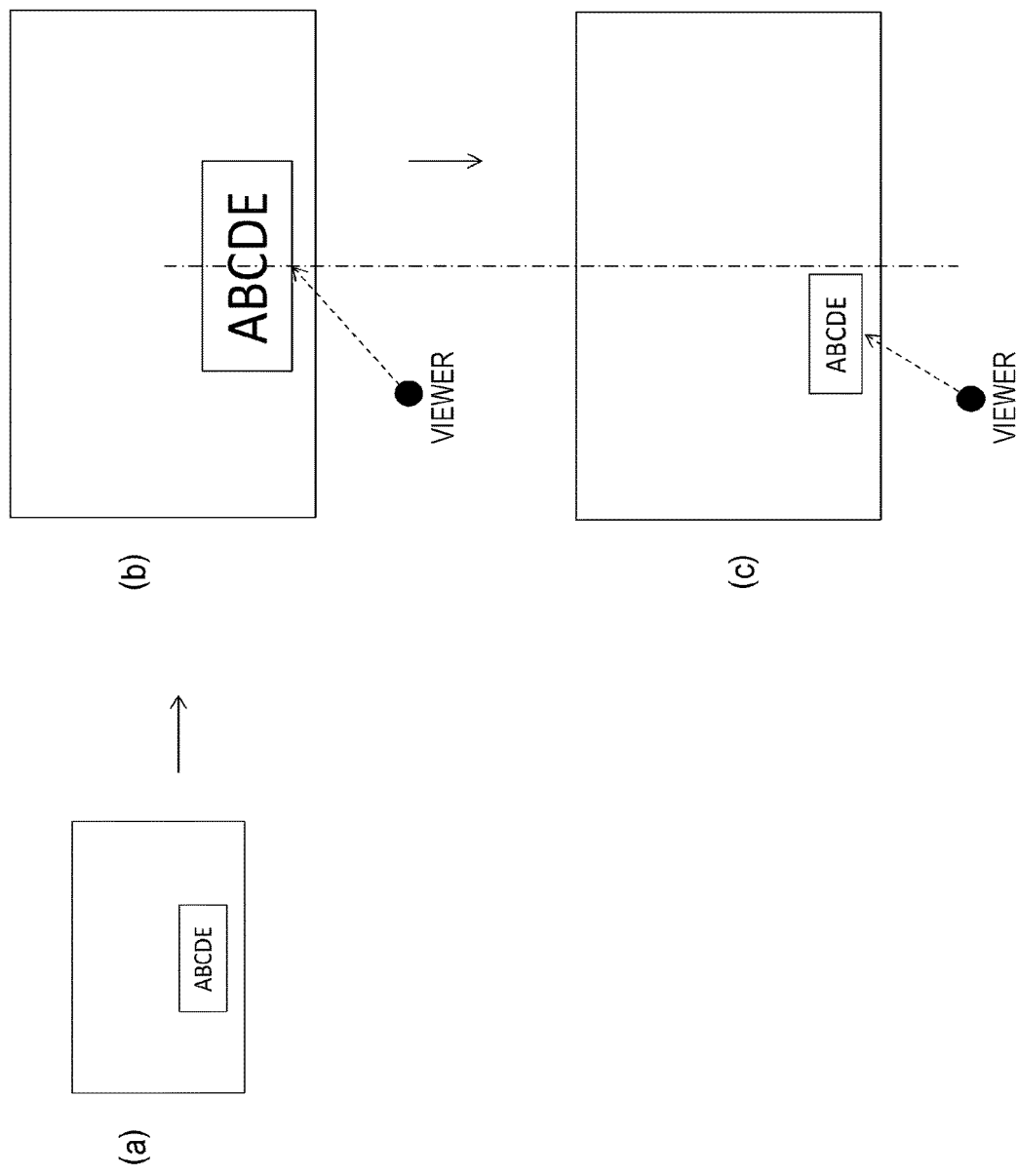
FIG. 18 illustrates diagrams for describing corrections of the size and display position of the subtitles.

FIG. 18(*a*) illustrates an exemplary display state of the subtitles (the captions) on the screen in a case where the size of the monitor is small. FIG. 18(*b*) illustrates an exemplary display state of the subtitles (the captions) on the screen in a case where the size of the monitor is large. The size correction of the subtitles has not been performed in the example. In this case, the size of the subtitles increases in proportion to the size of the monitor. Therefore, when the distance from the viewer to the monitor, namely, the viewing distance is short, the size of the subtitles is excessively large so that the viewer is annoyed. In addition, in this case, if the front position of the viewer is excessively away from the display position of the subtitles, the viewer has difficulty in viewing the subtitles naturally.

FIG. 18(*c*) illustrates an exemplary display state of the subtitles on the screen in a case where the size of the monitor is large. Scale-down correction has been performed to the size of the subtitles in the example, and thus provided is a state where the viewer is not annoyed even when the viewing distance is short. In addition, in the example, positioning correction has been performed to cause the display position of the subtitles to come close to the front position of the viewer so that the viewer has ease in viewing the subtitles naturally.

[Description of Size Correction Processing of Subtitles]

Size correction processing of the subtitles in the size/position conversion unit 210, will be described. First, automatic correction processing will be described. In a case where the resolution of the video on the monitor is HD, the viewing appropriate distance is expressed by the ratio of the distance to the monitor to the height of the monitor, and the value thereof is appropriately "3". However, it is said that the value varies in a case where the resolution of the video is UHD. That is, the value is small, namely, the viewing can be made at closer range.

In a case where being in a mode in which the automatic correction is allowed, in consideration of this, the size/position conversion unit 210 performs the automatic correction processing of the size of the subtitles. The size/position conversion unit 210 first calculates R with Mathematical Formula (1) below including D representing the viewing distance, M_h representing the height of the monitor, and f representing a value dependent on the resolution of the video. Note that the f has a larger value as the resolution of the video increases.

$$R=D/(M\_h*f) \qquad (1)$$

Next, the size/position conversion unit 210 performs the size correction of the subtitles (scale-up or scale-down) in accordance with the magnitude of the R to a threshold value. The size correction of the subtitles corresponds to size correction of the range of the region. The size/position conversion unit 210 performs interpolation processing to the bitmap data of the subtitles so as to perform the size correction of the subtitles.

The size/position conversion unit 210 performs scale-down correction to the size of the subtitles when the R is smaller than a threshold value TH1, and performs scale-up correction to the size of the subtitles when the R is larger than a threshold value TH2 larger than the threshold value TH1. In this case, the size/position conversion unit 210 limits the size correction of the subtitles, within the allowable range.

Figure 19:
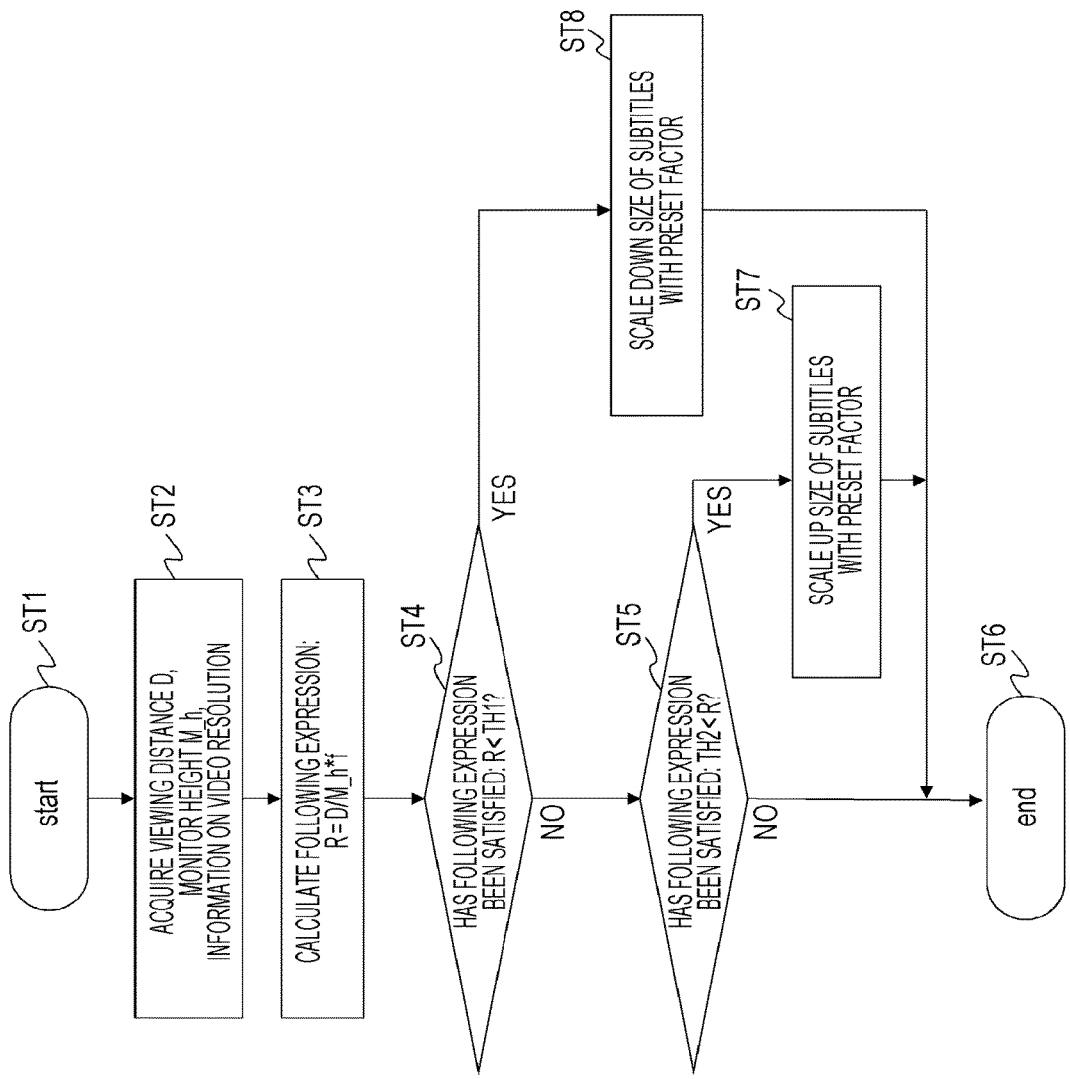
FIG. 19 is a flowchart of exemplary automatic correction processing of the size of the subtitles in a size/position conversion unit.

The flowchart of FIG. 19 illustrates exemplary automatic correction processing of the size of the subtitles in the size/position conversion unit 210. Note that, here, related processing in the control unit 201 will be also described as the processing of the size/position conversion unit 210.

The size/position conversion unit 210 first starts the processing at step ST1. Next, the size/position conversion unit 210 acquires, at step ST2, the viewing distance D, the height of the monitor M_h, and information on the resolution of the video. Then, the size/position conversion unit 210 calculates, at step ST3, the R with Mathematical Formula (1) described above.

Next, the size/position conversion unit 210 determines, at step ST4, whether the following expression has been satisfied: R<TH1. When determining that the following expression has not been satisfied: R<TH1, the size/position conversion unit 210 determines, at step ST5, whether the following expression is satisfied: R>TH2. When determining that the following expression has not been satisfied: R>TH2, the size/position conversion unit 210 completes the processing at step ST6. That is, in this case, the size/position conversion unit 210 makes the size of subtitles remain intact without the correction.

When the size/position conversion unit 210 determines, at step ST5, that the following expression has been satisfied: R>TH2, the processing proceeds to step ST7. At step ST7, the size/position conversion unit 210 scales up the size of the subtitles with a preset factor. Needless to say, the scale-up factor is limited within the allowable range. After the processing at step ST7, the size/position conversion unit 210 completes the processing at step ST6.

In addition, when the size/position conversion unit 210 determines, at step ST4, that the following expression has been satisfied: R<TH1, the processing proceeds to step ST8. At step ST8, the size/position conversion unit 210 scales down the size of the subtitles with a preset factor. Needless to say, the scale-down factor is limited within the allowable range. After the processing at step ST8, the size/position conversion unit 210 completes the processing at step ST6.

Next, the size correction processing of the subtitles in the size/position conversion unit 210 based on the user operation, will be described. In this case, the user operation unit 231 supplies operation information on the scale-up or scale-down of the size of the subtitles, to the control unit 201. The size/position conversion unit 210 performs the size correction of the subtitles corresponding to the user operation, on the basis of a command from the control unit 201.

The flowchart of FIG. 20 illustrates exemplary correction processing of the size of the subtitles in the size/position conversion unit 210 based on the user operation. The flowchart corresponds to a unit operation of the user, and the processing of the flowchart is repeated in a case where the operation is successively performed.

The size/position conversion unit 210 starts the processing at step ST11. Next, the size/position conversion unit 210 determines, at step ST12, determines whether the command from the control unit 201 is a scale-up order or a scale-down order for the size of the subtitles. When determining the scale-up order, the size/position conversion unit 210 scales up, at step ST13, the size of the subtitles by a predetermined factor when the upper-limited factor has not been reached.

That is, in this case, in a case where the scale-up factor of the size of the subtitles has already reached the allowable maximum value by the automatic correction processing or the correction processing based on the previous user operation, the size/position conversion unit 210 does not perform the scale-up processing at step ST13. Note that, in this case, the CE monitor 216 may display, to the user, a notification that the scale-up processing is impossible to perform, on the basis of the control of the control unit 201.

After the processing at step ST13, the size/position conversion unit 210 completes the processing at step ST14.

In addition, when determining the scale-down order at step ST12, the size/position conversion unit 210 scales down, at step ST15, the size of the subtitles by a predetermined factor when the lower-limited factor has not been reached.

That is, in this case, in a case where the scale-down factor of the size of the subtitles has already reached the allowable minimum value by the automatic correction processing or the correction processing based on the previous user operation, the size/position conversion unit 210 does not perform the scale-down processing at step ST15. Note that, in this case, the CE monitor 216 may display, to the user, a notification that the scale-down processing is impossible to perform, on the basis of the control of the control unit 201.

After the processing at step ST15, the size/position conversion unit 210 completes the processing at step ST14.

[Description of Display Position Correction Processing of Subtitles]

Display position correction processing of the subtitles in the size/position conversion unit 210, will be described. First, automatic correction processing will be described. In this case, in a case where being in the mode in which the automatic correction is allowed, the size/position conversion unit 210 automatically performs the display position correction of the subtitles, as described with FIGS. 12 and 14.

The flowchart of FIG. 21 illustrates exemplary automatic correction processing of the display position of the subtitles in the size/position conversion unit 210. Note that, here, related processing in the control unit 201 will be also described as the processing of the size/position conversion unit 210.

The size/position conversion unit 210 first starts the processing at step ST21. Next, the size/position conversion unit 210 acquires, at step ST22, the viewing distance D, the viewing angle E, the height of the monitor M_h, the width of the monitor M_w, and the information on the resolution of the video. Then, the size/position conversion unit 210 acquires, at step ST23, as the reference point P, the end portion of the original display position of the region on the viewing position side. In this case, the original display position of the region is the display position after the size correction processing when the size correction processing of the subtitles is performed.

Next, the size/position conversion unit 210 determines, at step ST24, whether the viewing angle E is the monitor size M_w or less. When determining that the viewing angle E is the monitor size M_w or less, the size/position conversion unit 210 calculates, at step ST25, the Q with Mathematical Formula (2) below.

$$Q=(E-P)/2 \qquad (2)$$

Next, the size/position conversion unit 210 determines, at step ST26, whether the viewing distance D is the appropriate viewing distance (=3*M_h) or more. When determining that the viewing distance D is the appropriate viewing distance or more, the size/position conversion unit 210 makes, at step ST27, the reference point P of the display position remain without moving the region. After the processing at step ST27, the size/position conversion unit 210 completes the processing at step ST28.

In addition, when the size/position conversion unit 210 determines, at step ST26, that the viewing distance D is less than the appropriate viewing distance, the processing proceeds to step ST29. At step ST29, the size/position conversion unit 210 moves the region in accordance with the viewing distance D so that the reference point P of the display position is positioned between the Q and the E. In this case, as the viewing distance D decreases, the E is more approached. After the processing at step ST29, the size/position conversion unit 210 completes the processing at step ST28.

In addition, when the size/position conversion unit 210 determines, at step ST24, that the viewing angle E is larger than the monitor size M_w, the processing proceeds to step ST30. At step ST30, the size/position conversion unit 210 calculates the Q with Mathematical Formula (3) below.

$$Q=(M\_w-P)/2 \qquad (3)$$

Next, the size/position conversion unit 210 determines, at step ST31, whether the viewing distance D is the appropriate viewing distance (=3*M_h) or more. When determining that the viewing distance D is the appropriate viewing distance or more, the size/position conversion unit 210 makes, at step ST32, the reference point P of the display position remain without moving the region. After the processing at step ST32, the size/position conversion unit 210 completes the processing at step ST28.

In addition, when the size/position conversion unit 210 determines, at step ST31, that the viewing distance D is less than the appropriate viewing distance, the processing proceeds to step ST33. At step ST33, the size/position conversion unit 210 moves the region in accordance with the viewing distance D so that the reference point P of the display position is positioned between the Q and the M_w in accordance with the viewing distance D. In this case, as the viewing distance D decreases, the M_w is more approached. After the processing at step ST33, the size/position conversion unit 210 completes the processing at step ST28.

Next, the display position correction processing of the subtitles in the size/position conversion unit 210 based on the user operation, will be described. In this case, the user operation unit 231 supplies positioning operation information on the display position of the subtitles in the horizontal direction or in the vertical direction, to the control unit 201. Note that the positioning operation information includes information on positioning directions, namely, information indicating the right or left in the horizontal direction and information indicating the up or down in the vertical direction. The size/position conversion unit 210 performs the display position correction of the subtitles corresponding to the user operation on the basis of a command from the control unit 201.

The flowchart of FIG. 22 illustrates exemplary correction processing of the display position of the subtitles in the size/position conversion unit 210 based on the user operation. The flowchart corresponds to a unit operation of the user, and the processing of the flowchart is repeated in a case where the operation is successively performed.

The size/position conversion unit 210 starts the processing at step ST41. Next, the size/position conversion unit 210 determines, at step ST42, whether the command from the control unit 201 is a positioning order in the horizontal direction (an H direction) or a positioning order in the vertical direction (a V direction) for the display position of the subtitles.

When determining the positioning order in the H direction, the size/position conversion unit 210 moves, at step ST43, the region in a specified direction (the right or left) in a range in which the positioning factor does not exceed the allowable maximum value. The size/position conversion unit 210 may not perform the positioning processing at step ST13. Note that, in this case, the CE monitor 216 may display, to the user, a notification that the positioning processing is impossible to perform, on the basis of the control of the control unit 201.

After the processing at step ST43, the size/position conversion unit 210 completes the processing at step ST44.

In addition, when the size/position conversion unit 210 determines, at step ST42, the positioning order in the V direction, the size/position conversion unit 210 moves, at step ST45, the region in a specified direction (the up or down) in a range in which the positioning factor does not exceed the allowable maximum value. The size/position conversion unit 210 may not perform the positioning processing at step ST45. Note that, in this case, the CE monitor 216 may display, to the user, a notification that the positioning processing is impossible to perform, on the basis of the control of the control unit 201.

After the processing at step ST45, the size/position conversion unit 210 completes the processing at step ST44.

Referring back to FIG. 16, the size/position conversion unit 211 performs, to the mixing ratio information (Mixing data) output from the subtitle decoder 209, correction processing similar to the correction processing of the size and display position of the subtitles in the size/position conversion unit 211.

The video superimposition unit 212 superimposes the bitmap data of the subtitles to which the size/position conversion unit 210 has performed the correction processing of the size and the display position, on the transmission video data V1 acquired by the video decoder 204. In this case, the video superimposition unit 212 mixes the bitmap data of the subtitles in the mixing ratio indicated with the mixing ratio information (Mixing data).

In this case, when the text information on the subtitles is transmitted as the subtitle data from the transmission side, the mixing ratio information (Mixing data) acquired by the subtitle decoder 206 is used. Meanwhile, when the bitmap data of the subtitles is transmitted as the subtitle data from the transmission side, the mixing ratio information (Mixing data) to which the size/position conversion unit 211 has performed the correction processing of the size and the display position, is used.

The YCbCr/RGB conversion unit 213 converts the transmission video data V1' on which the bitmap data of the subtitles has been superimposed, from the YCbCr (the luminance/chrominance) domain into the RGB domain. The electric-optic conversion unit 214 applies, to the transmission video data V1' converted into the RGB domain, an electric-optic conversion characteristic corresponding to an optic-electric conversion characteristic applied to the transmission video data V1', so as to perform electric-optic conversion so that display video data for displaying an image is acquired.

The display mapping unit 215 performs, to the display video data, display luminance adjustment corresponding to, for example, the maximum luminance display performance of the CE monitor 216. The CE monitor 216 displays the image on the basis of the display video data. The CE monitor 216 includes, for example, a liquid crystal display (LCD) or an organic electroluminescence display (organic EL display).

The operation of the reception device 200 illustrated in FIG. 16, will be simply described. The reception unit 202 receives the transport stream TS transmitted from the transmission device 100, the transport stream TS being disposed on the packet of the broadcast wave or the net. The transport stream TS is supplied to the system decoder 203. The system decoder 203 extracts the video stream VS and the subtitle stream SS from the transport stream TS.

The video stream VS extracted by the system decoder 203 is supplied to the video decoder 204. The video decoder 204 performs the decoding processing to the video stream VS so as to acquire the transmission video data V1. In addition, the video decoder 204 extracts the parameter set and the SEI message inserted into each access unit included in the video stream VS so as to send the parameter set and the SEI message to the control unit 201.

The subtitle stream SS extracted by the system decoder 203 is supplied to the subtitle decoder 206 in a case where the text information on the subtitles is transmitted as the subtitle data. The subtitle decoder 206 performs the decode processing to the segment data of each region included in the subtitle stream SS, so as to acquire the text data and the control code of each region. The control code also includes the mixing ratio information (Mixing data) on the subtitles and the background video.

In addition, the subtitle decoder 206 extracts the information indicating the allowable ranges of the size correction and the display position correction of the subtitles, inserted into the subtitle stream SS, so as to send the information to the control unit 201. In this case, the information has been inserted with the element of the styling (TTS). With this arrangement, the control unit 201 recognizes the allowable maximum value of the region scale-up factor, the allowable minimum value of the region scale-down factor, the allowable maximum value of the region horizontal positioning factor, and the allowable maximum value of the region vertical positioning factor.

The text data and the control code of each region acquired by the subtitle decoder 206 are supplied to the font expansion unit 207. The font expansion unit 207 performs the font expansion on the basis of the text data and the control code of each region, so as to acquire the bitmap data of each region. The RGB/YCbCr conversion unit 208 converts the bitmap data of each region acquired by the font expansion unit 207, from the RGB domain into the YCbCr (the luminance/chrominance) domain.

In addition, the subtitle stream SS extracted by the system decoder 203 is supplied to the subtitle decoder 209 in a case where the bitmap data of the subtitles is transmitted as the subtitle data. The subtitle decoder 209 performs the decode processing to the subtitle stream SS so as to acquire the bitmap data of the subtitles and the mixing ratio information (Mixing data) on the subtitles and the background video.

The bitmap data of the subtitles output from the RGB/YCbCr conversion unit 208 or the subtitle decoder 209, is supplied to the size/position conversion unit 210. The size/position conversion unit 210 performs the processing of correcting the size and display position of the subtitles, to the bitmap data of the subtitles. In this case, the correction processing is performed automatically or in accordance with the user operation, under the control of the control unit 201 (refer to FIGS. 19 to 22). The correction is performed within the allowable ranges.

The transmission video data V1 acquired by the video decoder 204 is supplied to the video superimposition unit 211. In addition, the bitmap data of the subtitles to which the size/position conversion unit 210 has performed the correction processing of the size and the display position, is supplied to the video superimposition unit 211. Furthermore, the mixing ratio information (Mixing data) acquired by the subtitle decoder 206 or the mixing ratio information (Mixing data) to which the size/position conversion unit 211 has performed the correction processing of the size and the display position, is supplied to the video superimposition unit 211.

The video superimposition unit 212 superimposes, on the transmission video data V1, the bitmap data of the subtitles to which the corrections of the size and the display position have been performed automatically on the basis of information, such as the monitor size and the viewing position, or in accordance with the user operation. The transmission video data V1' on which the bitmap data has been superimposed, is supplied to the YCbCr/RGB conversion unit 213.

The YCbCr/RGB conversion unit 213 converts the transmission video data V1' from the YCbCr (the luminance/chrominance) domain into the RGB domain, so as to supply the transmission video data V1' to the electric-optic conversion unit 214. The electric-optic conversion unit 214 applies, to the transmission video data V1', the electric-optic conversion characteristic corresponding to the optic-electric conversion characteristic applied to the transmission video data V1', so as to perform the electric-optic conversion so that the display video data is acquired.

The display video data is supplied to the display mapping unit 215. The display mapping unit 215 performs, to the display video data, the display luminance adjustment corresponding to, for example, the maximum luminance display performance of the CE monitor 216. The display video data to which the display luminance adjustment has been performed in this manner, is supplied to the CE monitor 216. The CE monitor 216 displays the image on the basis of the display video data.

As described above, the reception device 200 performs the processing of correcting the size and display position of the subtitles, to the bitmap data of the subtitles, in the transmission and reception system 10 illustrated in FIG. 1. Therefore, the subtitles can be favorably superimposed and displayed on the video, for example, even when the display is performed on the monitor having a large screen and the viewing distance is short.

In addition, the reception device 200 automatically corrects the size of the subtitles and the display position of the subtitles on the basis of the viewing position information and the monitor size information, in the transmission and reception system 10 illustrated in FIG. 1. Therefore, the size and display position of the subtitles can be brought into an appropriate state with the user, such as the viewer, not required to perform a time-consuming operation.

In addition, the reception device 200 corrects the size of the subtitles and the display position of the subtitles on the basis of the user operation, in the transmission and reception system 10 illustrated in FIG. 1. Therefore, the user, such as the viewer, can bring the size and display position of the subtitles into a desired state.

In addition, the reception device 200 limits the corrections of the size and display position of the subtitles, within the allowable ranges, in the transmission and reception system 10 illustrated in FIG. 1. Therefore, excessive corrections can be avoided.

In addition, the reception device 200 extracts the correction allowable range information from the layer of the subtitle stream so as to limit the corrections of the size and display position of the subtitles within the allowable ranges on the basis of the allowable range information, in the transmission and reception system 10 illustrated in FIG. 1. Therefore, the size correction and the display position correction of the subtitles can be appropriately limited.

In addition, the transmission device 100 inserts the correction allowable range information on the size and display position of the subtitles, into the layer of the subtitle stream so as to transmit the correction allowable range information, in the transmission and reception system 10 illustrated in FIG. 1. Therefore, the size correction and the display position correction of the subtitles can be appropriately limited with the correction allowable range information, on the reception side.

<2. Modification>

Note that, according to the embodiment described above, the example in which the size and display position of the subtitles can be corrected, has been given. The present technology can be similarly applied to even a case where graphics or other similar information is superimposed and displayed on the video, and thus the size and display position of the graphics or the other similar information can be favorably corrected.

In addition, according to the embodiment described above, the example in which the container is MPEG-2 TS, has been given. However, the present technology is not limited to MPEG-2 TS as the container, and thus can be similarly applied to other packets, such as ISOBMFF and MMT.

In addition, the present technology can have the following configurations.

(1) A reception device includes: a reception unit configured to receive a container in a predetermined format, the container including a video stream having video data and a subtitle stream having subtitle data; a video decode unit configured to perform decode processing to the video stream to acquire the video data; a subtitle decode unit configured to perform decode processing to the subtitle stream to acquire bitmap data of subtitles; a subtitle processing unit configured to perform processing of correcting at least one of a size of the subtitles and a display position of the subtitles to the bitmap data of the subtitles; and a video superimposition unit configured to superimpose the bitmap data of the subtitles to which the processing has been performed, on the video data.

(2) According to the reception device described in (1) above, the subtitle processing unit automatically corrects the at least one of the size of the subtitles and the display position of the subtitles on the basis of viewing position information and monitor size information.

(3) The reception device described in (2) above, further includes: an information acquisition unit configured to acquire the viewing position information.

(4) According to the reception device described in (2) or (3) above, the subtitle processing unit calculates the following expression: R=D/(M_h*f), the D representing a viewing distance, the M_h representing a height of a monitor, the f representing a value dependent on resolution of a video, to perform scale-down correction to the size of the subtitles when the R is smaller than a first threshold value, and to perform scale-up correction to the size of the subtitles when the R is larger than a second threshold value larger than the first threshold value.

(5) According to the reception device described in any of (2) to (4) above, the subtitle processing unit moves, when a viewing horizontal position is present outer than an end point of a region in a horizontal direction, the region being an area on which the subtitles are displayed, a position of the region to the viewing horizontal position in the horizontal direction in accordance with a distance from the end point to the viewing horizontal position, to automatically correct the display position of the subtitles.

(6) According to the reception device described in (2) to (4) above, the subtitle processing unit moves, when a viewing vertical position is present outer than an end point of a region in a vertical direction, the region being an area on which the subtitles are displayed, a position of the region to the viewing vertical position in the vertical direction in accordance with a distance from the end point to the viewing vertical position, to automatically correct the display position of the subtitles.

(7) According to the reception device described in any of (1) to (6) above, the subtitle processing unit corrects the at least one of the size of the subtitles and the display position of the subtitles on the basis of a user operation.

(8) According to the reception device described in any of (1) to (7) above, the subtitle processing unit limits at least one of the correction of the size of the subtitles and the correction of the display position of the subtitles within an allowable range.

(9) The reception device described in (8) above, further includes: an information extraction unit configured to extract allowable range information on the correction from a layer of the subtitle stream, the allowable range information on the correction being inserted into the layer of the subtitle stream. The subtitle processing unit limits the correction within the allowable range on the basis of the allowable range information on the correction that has been extracted.

(10) A reception method includes: a reception step of receiving a container in a predetermined format by a reception unit, the container including a video stream having video data and a subtitle stream having subtitle data; a video decode step of performing decode processing to the video stream to acquire the video data; a subtitle decode step of performing decode processing to the subtitle stream to acquire bitmap data of subtitles; a subtitle processing step of performing processing of correcting at least one of a size of the subtitles and a display position of the subtitles, to the bitmap data of the subtitles; and a video superimposition step of superimposing the bitmap data of the subtitles to which the processing has been performed, on the video data.

(11) A transmission device includes: a transmission unit configured to transmit a container in a predetermined format, the container including a video stream having video data and a subtitle stream having subtitle data; and an information insertion unit configured to insert at least one of a piece of information indicating an allowable range of size correction of subtitles and a piece of information indicating an allowable range of display position correction of the subtitles, into a layer of the subtitle stream.

(12) A transmission method includes: a transmission step of transmitting a container in a predetermined format by a transmission unit, the container including a video stream having video data and a subtitle stream having subtitle data; and an information insertion step of inserting at least one of a piece of information indicating an allowable range of size correction of the subtitles and a piece of information indicating an allowable range of display position correction of the subtitles, into a layer of the subtitle stream.

(12) A reception device includes: a reception unit configured to receive a container in a predetermined format, the container including a video stream having video data and a graphics stream having graphics data; a video decode unit configured to perform decode processing to the video stream to acquire the video data; a graphics decode unit configured to perform decode processing to the graphics stream to acquire bitmap data of graphics; a graphics processing unit configured to perform processing of correcting at least one of a size of the graphics and a display position of the graphics, to the bitmap data of the graphics; and a video superimposition unit configured to superimpose the bitmap data of the graphics to which the processing has been performed, on the video data.

(13) A transmission device includes: a transmission unit configured to transmit a container in a predetermined format, the container including a video stream having video data and a graphics stream having graphics data; and an information insertion unit configured to insert at least one of a piece of information indicating an allowable range of size correction of graphics and a piece of information indicating an allowable range of display position correction of the graphics, into a layer of the graphics stream.

A main feature of the present technology is that the processing unit that corrects the size and display position of the subtitles (graphics) has been provided to the bitmap data of the subtitles (the graphics) so that the subtitles (the graphics) can be favorably superimposed and displayed on the video (refer to FIG. 18).

REFERENCE SINGS LIST

10 Transmission and reception system
100 Transmission device
101 Control unit
102 Camera
103 Video optic-electric conversion unit
104 RGB/YCbCr conversion unit
105 Video encoder
106 Subtitle generation unit
107 Text format conversion unit
108 Subtitle encoder
109 System encoder
110 Transmission unit
111 Bitmap data generation unit
113 Subtitle encoder
200 Reception device
201 Control unit
202 Reception unit
203 System decoder
204 Video decoder
206 Subtitle decoder
207 Font expansion unit
208 RGB/YCbCr conversion unit
209 Subtitle decoder
209 YCbCr/RGB conversion unit
210, 211 Size/position conversion unit
212 Video superimposition unit
213 YCbCr/RGB conversion unit
214 Electric-optic conversion unit
215 Display mapping unit
216 CE monitor
231 User operation unit
232 Image sensor

The invention claimed is:

1. A reception device comprising:
a receiver configured to receive a video stream having video data and a subtitle stream having subtitle data; and
processing circuitry configured to
control decoding the video stream to acquire the video data, subtitle decode processing to acquire bitmap data of subtitles, subtitle processing to correct at least one of a size of the subtitles and a display position of the subtitles based on the bitmap data of the subtitles, and video superimposition processing to superimpose corrected subtitles,
wherein the subtitle processing is configured to perform a scale-down correction to the size of the subtitles when a correction factor is less than a first threshold value, and to perform a scale-up correction to the size of the subtitles when the correction factor is greater than a second threshold value, and the correction factor is proportional to a viewing distance and inversely proportional to a height dimension of a monitor and a value dependent on a resolution of a video.

2. The reception device according to claim 1, wherein, in the subtitle processing, the display position of the subtitles is automatically corrected on the basis of viewing position information and monitor size information.

3. The reception device according to claim 2, wherein the processing circuitry is further configured to
acquire the viewing position information.

4. The reception device according to claim 2, wherein, in the subtitle processing, the following expression is calculated: $R = D/(M\_h * f)$, the D representing the viewing distance, the M_h representing the height of the monitor, the f representing the value dependent on the resolution of the video, where R is the correction factor.

5. The reception device according to claim 2, wherein, in the subtitle processing, when a viewing horizontal position is present outer than an end point of a region in a horizontal direction, the region being an area on which the subtitles are displayed, a position of the region is moved to the viewing horizontal position in the horizontal direction in accordance with a distance from the end point to the viewing horizontal position, to automatically correct the display position of the subtitles.

6. The reception device according to claim 2, wherein, in the subtitle processing, when a viewing vertical position is present outside an end point of a region in a vertical direction, the region being an area on which the subtitles are displayed, a position of the region is moved to the viewing vertical position in the vertical direction in accordance with a distance from the end point to the viewing vertical position, to automatically correct the display position of the subtitles.

7. The reception device according to claim 1, wherein, in the subtitle processing, the at least one of the size of the subtitles and the display position of the subtitles is corrected on the basis of a user operation.

8. The reception device according to claim 1, wherein, in the subtitle processing, the at least one of the correction of the size of the subtitles and the correction of the display position of the subtitles is limited within an allowable range.

9. The reception device according to claim 8, wherein the processing circuitry is further configured to
extract allowable range information on the correction from a layer of the subtitle stream, the allowable range information on the correction being inserted into the layer of the subtitle stream,
wherein, in the subtitle processing, the correction is limited within the allowable range on the basis of the allowable range information on the correction that has been extracted.

10. A reception method comprising:
receiving a video stream having video data and a subtitle stream having subtitle data;
performing decode processing to the video stream to acquire the video data;
performing decode processing to the subtitle stream to acquire bitmap data of subtitles;
performing subtitle processing of correcting at least one of a size of the subtitles and a display position of the subtitles, to the bitmap data of the subtitles; and
superimposing the bitmap data of the subtitles to which the processing has been performed, on the video data,
wherein the subtitle processing is configured to perform a scale-down correction to the size of the subtitles when a correction factor is less than a first threshold value, and to perform a scale-up correction to the size of the subtitles when the correction factor is greater than a second threshold value, and the correction factor is proportional to a viewing distance, and inversely proportional to a height dimension of a monitor and a value dependent on a resolution of a video.

11. A transmission device comprising:

a transmitter configured to transmit a container, the container including a video stream having video data and a subtitle stream having subtitle data; and processing circuitry configured to insert at least one of a piece of information indicating an allowable range of size correction of subtitles and a piece of information indicating an allowable range of display position correction of the subtitles, into a layer of the subtitle stream, the at least one of the piece of information being included in subtitle processing, wherein the subtitle processing is configured to perform a scale-down correction to the size of the subtitles when a correction factor is less than a first threshold value, and to perform a scale-up correction to the size of the subtitles when the correction factor is greater than a second threshold value, the correction factor is proportional to a viewing distance, and inversely proportional to a height dimension of a monitor and a value dependent on a resolution of a video.

12. A transmission method comprising:

transmitting a container by a transmitter, the container including a video stream having video data and a subtitle stream having subtitle data; and inserting at least one of a piece of information indicating an allowable range of size correction of the subtitles and a piece of information indicating an allowable range of display position correction of the subtitles, into a layer of the subtitle stream, the at least one of the piece of information being included in subtitle processing, wherein the subtitle processing is configured to perform a scale-down correction to the size of the subtitles when a correction factor is less than a first threshold value, and to perform a scale-up correction to the size of the subtitles when the correction factor is greater than a second threshold value, and the correction factor is proportional to a viewing distance, and inversely proportional to a height dimension of a monitor and a value dependent on a resolution of a video.

\* \* \* \* \*